(12) United States Patent
Ham et al.

(10) Patent No.: US 10,362,142 B2
(45) Date of Patent: Jul. 23, 2019

(54) ELECTRONIC DEVICE CONNECTED TO ANOTHER ELECTRONIC DEVICE AND METHOD OF CONTROLLING SAME

(71) Applicant: Samsung Electronics Co., Ltd., Gyeonggi-do (KR)

(72) Inventors: Dong-Eup Ham, Gyeonggi-do (KR); Jae-Hwan Kim, Gyeonggi-do (KR); Hyung-Jin Park, Gyeonggi-do (KR); Ki-Huk Lee, Gyeonggi-do (KR); Bo-Kun Choi, Seoul (KR); Dong-Soo Han, Seoul (KR); Joo-Man Han, Seoul (KR); Dong-Il Son, Gyeonggi-do (KR); Sun-Kee Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 266 days.

(21) Appl. No.: 14/965,465

(22) Filed: Dec. 10, 2015

(65) Prior Publication Data
US 2016/0173679 A1    Jun. 16, 2016

(30) Foreign Application Priority Data
Dec. 10, 2014    (KR) ........................ 10-2014-0177551

(51) Int. Cl.
| G06F 15/16 | (2006.01) |
| H04L 29/08 | (2006.01) |
| H04W 4/02  | (2018.01) |
| H04W 24/08 | (2009.01) |
| H04M 1/725 | (2006.01) |
| H04W 4/60  | (2018.01) |
| H04W 4/70  | (2018.01) |

(52) U.S. Cl.
CPC .............. *H04L 67/34* (2013.01); *H04L 67/12* (2013.01); *H04M 1/7253* (2013.01); *H04W 4/023* (2013.01); *H04W 4/60* (2018.02); *H04W 4/70* (2018.02); *H04W 24/08* (2013.01); *H04M 1/72525* (2013.01)

(58) Field of Classification Search
CPC ............................... G06F 17/18; G06F 9/5077
USPC .................................................. 709/234, 203
See application file for complete search history.

(56) References Cited

U.S. PATENT DOCUMENTS

| 6,396,399 | B1 * | 5/2002 | Dunlap | H04W 88/02 340/539.1 |
| 9,420,446 | B2 * | 8/2016 | Brown | H04W 4/22 |
| 2007/0279852 | A1 | 12/2007 | Daniel et al. | |
| 2013/0124309 | A1 * | 5/2013 | Traasdahl | H04L 67/22 705/14.49 |
| 2013/0169546 | A1 * | 7/2013 | Thomas | G06F 9/4451 345/173 |
| 2014/0059494 | A1 * | 2/2014 | Lee | G06F 3/0482 715/835 |
| 2014/0159912 | A1 * | 6/2014 | Fraden | A61B 5/002 340/870.02 |

(Continued)

*Primary Examiner* — Hamza N Algibhah
(74) *Attorney, Agent, or Firm* — The Farrell Law Firm, P.C.

(57) ABSTRACT

An electronic device and a control method of the electronic device are provided. The control method includes acquiring second device information on a second electronic device connected to the first electronic device, and determining a first application corresponding to a combination of the first electronic device and the second electronic device based on first device information on the first electronic device and the second device information.

21 Claims, 17 Drawing Sheets

(56) References Cited

U.S. PATENT DOCUMENTS

| | | | | |
|---|---|---|---|---|
| 2014/0244745 A1* | 8/2014 | Murarka | H04L 67/22 | 709/204 |
| 2014/0250179 A1* | 9/2014 | Brown | H04L 29/06 | 709/204 |
| 2014/0302791 A1* | 10/2014 | Mok | H04W 52/383 | 455/41.2 |
| 2014/0344448 A1* | 11/2014 | Ha | H04L 43/0876 | 709/224 |
| 2015/0079969 A1* | 3/2015 | Kawase | H04M 1/6083 | 455/419 |
| 2015/0163163 A1* | 6/2015 | Kato | H04L 47/76 | 709/226 |
| 2015/0287338 A1* | 10/2015 | Wells | G09B 19/0038 | 702/19 |
| 2016/0021524 A1* | 1/2016 | Xie | H04W 64/00 | 455/41.1 |
| 2016/0027399 A1* | 1/2016 | Wilde | G06F 13/382 | 345/520 |
| 2016/0051192 A1* | 2/2016 | Kang | A61B 5/002 | 600/364 |
| 2016/0381553 A1* | 12/2016 | Lee | H04W 4/001 | 455/411 |

* cited by examiner

ELECTRONIC DEVICE CONNECTED TO ANOTHER ELECTRONIC DEVICE AND METHOD OF CONTROLLING SAME

PRIORITY

This application claims priority under 35 U.S.C. § 119(a) to Korean Patent Application Serial No. 10-2014-0177551, which was filed in the Korean Intellectual Property Office on Dec. 10, 2014, the entire content of which is incorporated herein by reference.

BACKGROUND

1. Field of the Disclosure

The present disclosure relates generally to an electronic device connected to another electronic device and a method of controlling the same.

2. Description of the Related Art

Recently, the introduction of technologies related to the Internet of Things (IoT) is actively in progress. IoT refers to a technology that can perform Internet-based communication between real world objects, such as home appliances, sensors, and the like. Conventionally, Mobile-to-Mobile (M2M) enables communication between objects through mobile communication equipment. IoT extends the communication to the Internet and is based on the concept of interacting with information existing in both the real world and in virtual environments, as well as communicating between people and objects. That is, IoT is a connection network that forms an intelligent relation, such as sensing, networking, information processing, and the like through cooperation, based on the Internet network, without separate human intervention, to three environmental elements of the human, object, and service. In connection with IoT, a communication scheme through a Zig-bee communication-based Internet Protocol (IP) address has been developed by the IPv6 over Low power Wireless Personal Area Networks (6LoWPAN) standardization organization. Further, a communication scheme through a Bluetooth communication-based IP address has been developed by the 6lo standardization organization. As described above, attempts to combine the IP address with different types of communication schemes are increasing.

Following the introduction of IoT, the electronic device may form a communication connection with another electronic device and transmit/receive data to/from another electronic device. However, the conventional electronic device only performs an operation for transmitting or receiving particular data to/from another electronic device and is unable to control the electronic device based on a characteristic of another electronic device connected to the electronic device.

SUMMARY

The present disclosure has been made to address at least the problems and the disadvantages described above, and to provide at least the advantages described below.

Accordingly, an aspect of the present disclosure is to provide a communication method and apparatus to solve the above described problems or other problems.

Accordingly, another aspect of the present disclosure is to provide a control method for controlling an electronic device based on a characteristic of another electronic device connected to the electronic device.

Accordingly, another aspect of the present disclosure is to provide and control an optimal operation based on a combination of two or more electronic devices.

In accordance with an aspect of the present disclosure, a control method of a first electronic device is provided. The control method includes acquiring second device information on a second electronic device connected to the first electronic device, and determining a first application corresponding to a combination of the first electronic device and the second electronic device based on first device information on the first electronic device and the second device information.

In accordance with another aspect of the present disclosure, a first electronic device is provided. The first electronic device includes a connection module that transmits and receives data to and from a second electronic device; and a processor that acquires second device information on the second electronic device connected to the first electronic device, and determines a first application corresponding to a combination of the first electronic device and the second electronic device based on first device information on the first electronic device and the second device information.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
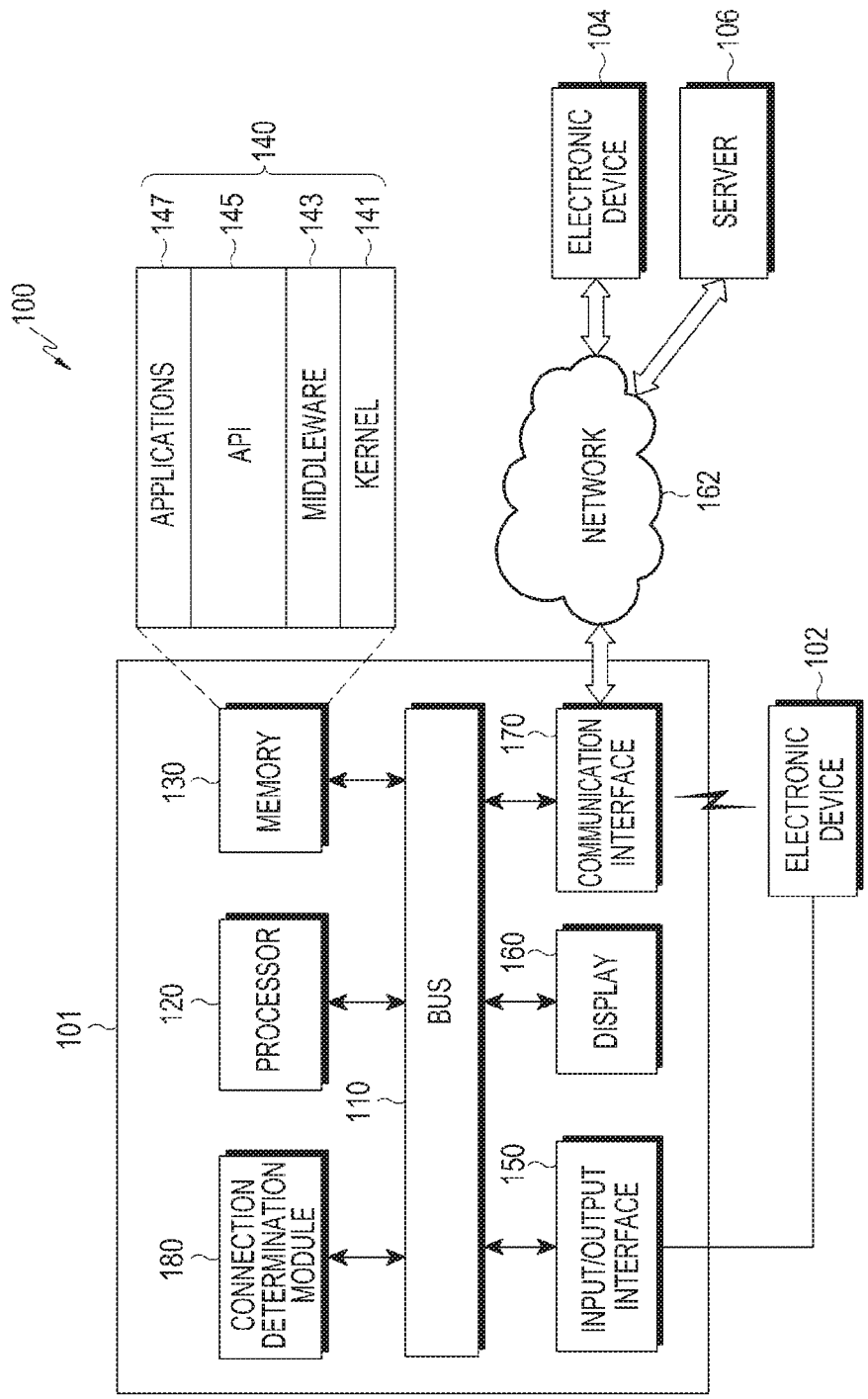
FIG. 1 illustrates a network environment including an electronic device, according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expressions "have", "may have", "include", and "may include" refer to the existence of a corresponding feature (e.g., numerical value, function, operation, or components such as elements), and do not exclude the existence of additional features.

In the present disclosure, the expressions "A or B", "at least one of A or/and B", and "one or more of A or/and B" may include all possible combinations of the items listed. For example, the expressions "A or B", "at least one of A and B", and "at least one of A or B" refer to all of (1) including A, (2) including B, or (3) including all of A and B.

Expressions, such as "a first", "a second", "the first", or "the second" used herein may modify various components regardless of the order and/or the importance but do not limit the corresponding components. The above expressions are used merely for the purpose of distinguishing an element from the other elements. For example, a first user device and a second user device indicate different user devices although both are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled to the second element or any other element (e.g., third element) may be interposer between them. In contrast, it may be understood that when an element (e.g., first element) is referred to as being "directly connected," or "directly coupled" to another element (e.g., second element), there is no other element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the same meanings as the contextual meanings in the relevant field of the art, and are not to be interpreted to have ideal or excessively formal meanings unless clearly defined in the present disclosure. In some cases, even terms defined in the present disclosure should not be interpreted to exclude embodiments of the present disclosure.

The electronic device according to an embodiment of the present disclosure may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g., a Head-Mounted Device (HMD), such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS)

receiver, an Event Data Recorder (EDR), a Flight Data Recorder (FDR), a vehicle infotainment devices, an electronic devices for a ship (e.g., a navigation device for a ship, and a gyro-compass), avionics, security devices, an automotive head unit, a robot for home or industry, an Automatic Teller Machine (ATM), Point of Sales (POS) machine, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to various embodiments of the present disclosure may be a combination of one or more of the aforementioned various devices.

The electronic device according to some embodiments of the present disclosure may be a flexible device.

Further, the electronic device according to an embodiment of the present disclosure is not limited to the aforementioned devices, and may include new electronic devices according to the development of new technologies.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device, according to an embodiment of the present disclosure.

Referring to FIG. 1, an electronic device 101 within a network environment 100 according to various embodiments is disclosed. The electronic device 101 includes a bus 110, a processor 120, a memory 130, an input/output interface 150, a display 160, a communication module 170, and a connection determination module 180. According to some embodiments, the electronic device 101 may omit at least some of the above components or further include other components.

The bus 110 includes a circuit for connecting the components 120 to 180 and transmitting communication between the components (for example, control messages and/or data).

The processor 120 includes one or more of a Central Processing Unit (CPU), an Application Processor (AP), and a Communication Processor (CP). The processor 120 controls one or more other components of the electronic device 101, processes calculations related to communication, and/or performs data processing. The processor 120 may be called a controller or may include a controller as a part thereof.

The memory 130 may include a volatile memory and/or a non-volatile memory. The memory 130 stores instructions or data related to at least one other component of the electronic device 101. The memory 130 stores software and/or a program 140.

The program 140 includes a kernel 141, middleware 143, an Application Programming Interface (API) 145, and/or an application programs (or applications) 147. At least some of the kernel 141, the middle 143, and the API 145 may be referred to as an Operating System (OS).

The kernel 141 controls or manages system resources (for example, the bus 110, the processor 120, the memory 130, and the like) used for executing an operation or function implemented by the other programs (for example, the middleware 143, the API 145, or the application program 147). Furthermore, the kernel 141 provides an interface through which the middleware 143, the API 145, or the application program 147 accesses individual components of the electronic device 101 to control or manage system resources.

For example, the middleware 143 serves as a relay for allowing the API 145 or the application programs 147 to communicate with the kernel 141 to exchange data. Furthermore, in regard to task requests received from the application program 147, the middleware 143 performs a control (for example, scheduling or load balancing) for the task requests using a method of assigning at least one application a priority for using the system resources (for example, the bus 110, the processor 120, or the memory 130) of the electronic device 101.

The API 145 is an interface by which the applications 147 control functions provided from the kernel 141 or the middleware 143, and may include at least one interface or function (for example, commands) for file control, window control, image processing, or text control.

The input/output interface 150 serves as an interface which transmits commands or data input from the user or an external device to other component(s) of the electronic device 101. Further, the input/output interface 150 outputs commands or data received from another component(s) of the electronic device 101 to the user or an external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) to users. The display 160 may include a touch screen, and may receive, for example, a touch, gesture, proximity, or hovering input using an electronic pen or a user's body part.

The communication module 170 configures communication between the electronic device 101 and an external device (for example, a first external electronic device 102, a second external electronic device 104, or a server 106). For example, the communication module 170 may be connected to a network 162 through wireless or wired communication to communicate with the second external electronic device 104 or the server 106.

The wireless communication may use, for example, at least one of Long Term Evolution (LTE), LTE-Advanced (LTE-A), Code Division Multiple Access (CDMA), Wideband CDMA (WCDMA), Universal Mobile Telecommunication System (UMTS), Wireless Broadband (WiBro), and Global System for Mobile communication (GSM), for example, as a cellular communication protocol. The wired communication includes, for example, at least one of a Universal Serial Bus (USB), a High Definition Multimedia Interface (HDMI), Recommended Standard 232 (RS-232), and a Plain Old Telephone Service (POTS). The network 162 includes at least one of communication networks such as a computer network (for example, a LAN or a WAN), the Internet, and a telephone network.

Each of the first external electronic device 102 and the second external electronic devices 104 may be a device which is the same as or different from the electronic device 101.

The server 106 may include a group of one or more servers.

All or some of the operations performed by the electronic device 101 may be performed by the first external electronic device 102, the second external electronic device 104 or the server 106. When the electronic device 101 should perform some functions or services automatically or by request, the electronic device 101 makes a request for performing at least some of the functions related to the functions or services to the first external electronic device 102, the second external electronic device 104, or the server 106, instead of performing the functions or services by itself. The other electronic may carry out the requested function or the additional function and transfer the result, obtained by carrying out the function, to the electronic device 101. The electronic device 101 provides the requested functions or services based on the received result as it is or after additionally processing the received result. To achieve this, for example, cloud computing, distributed computing, or client-server computing technology may be used.

The connection determination module 180 supports driving the electronic device 101 by performing at least one of the operations (or functions) implemented by the electronic device 101.

The connection determination module 180 processes at least some of the information obtained from other components (for example, at least one of the processor 120, the memory 130, the input/output interface 150, and the communication interface 170) and utilizes the same in various manners. For example, the connection determination module 180 controls at least some functions of the electronic device 101 by using the processor 120 or controls at least some of the functions independently so that the electronic device 101 may interwork with other electronic devices, such as the first external electronic device 102, the second external electronic device 104, or the server 106. The connection determination module 180 may be integrated into the processor 120 or the communication module 170. At least one component of the connection determination module 180 may be included in the server 106, and at least one operation implemented in the connection determination module 180 may be supported by the server 106.

Figure 2:
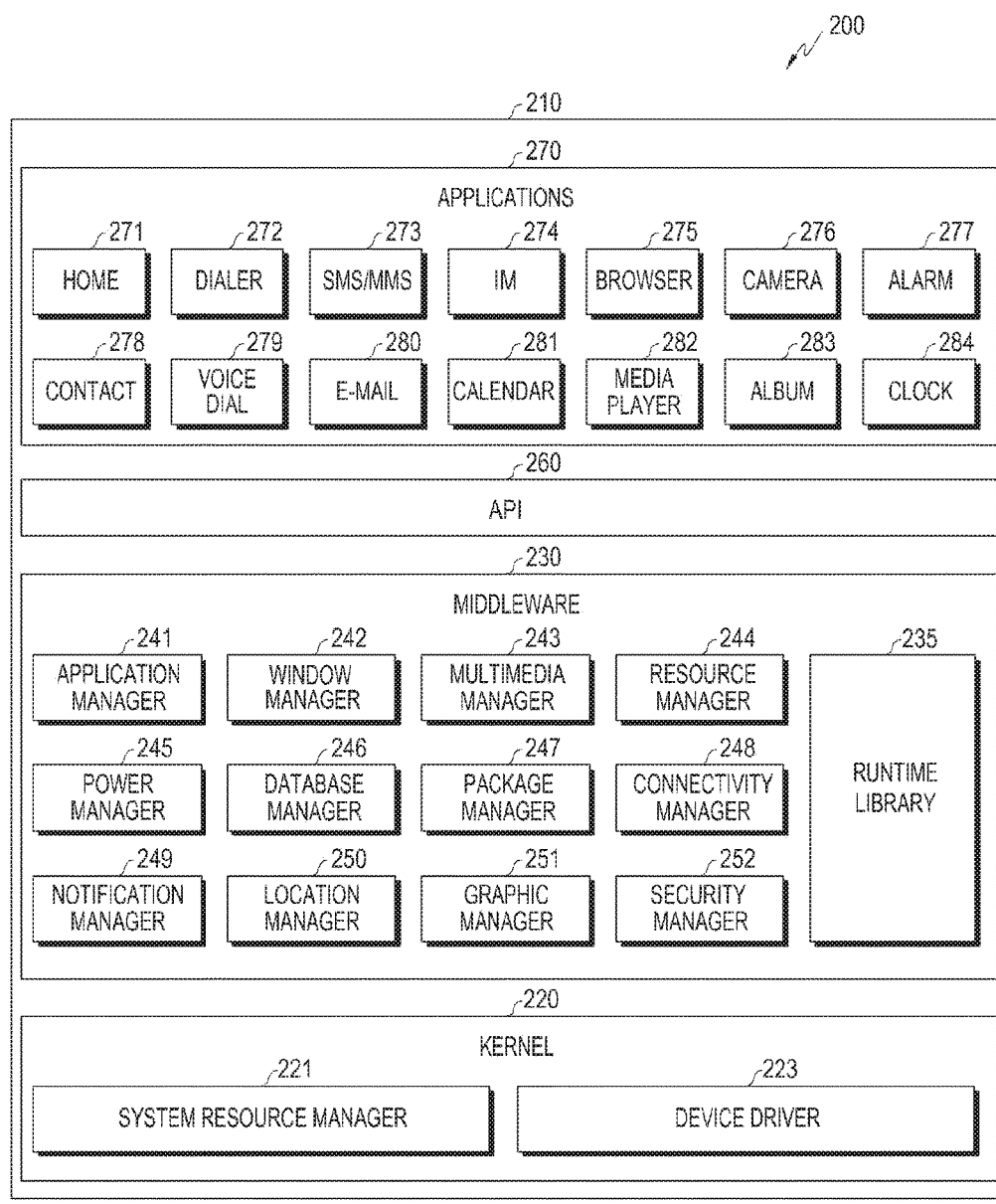
FIG. 2 is a block diagram of a program module, according to an embodiment of the present disclosure.

FIG. 2 is a block diagram of a program module, according to an embodiment of the present disclosure.

Referring to FIG. 2, a program module 210 (for example, the program 140) includes an Operating System (OS) for controlling resources related to the electronic device 101 and/or various applications 147 executed in the operating system. The operating system may be, for example, Android, iOS, Windows, Symbian, Tizen, Bada, or the like.

The program module 210 includes a kernel 220, middleware 230, an Application Programming Interface (API) 260, and/or applications 270. At least some of the program module 210 may be preloaded in the electronic device 101 or downloaded from the server 106.

The kernel 220 (for example, the kernel 141) includes a system resource manager 221 or a device driver 223.

The system resource manager 221 controls, allocates, or collects the system resources. The system resource manager 221 may include a process manager, a memory manager, or a file system manager.

The device driver 223 may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 230 (for example, the middleware 143) provides a common function required by the applications 270 or provides various functions to the applications 270 through the API 260, so that the applications 270 may efficiently use limited system resources of the electronic device 101. The middleware 230 includes, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The run time library 235 includes a library module that a compiler uses in order to add new functions through a programming language while the application 270 is executed. The run time library 235 performs input/output management, memory management, or a function for an arithmetic function.

The application manager 241 manages a life cycle of at least one application of the applications 270.

The window manager 242 manages a GUI resource used in a screen.

The multimedia manager 243 detects a format required for reproducing various media files and encodes or decodes a media file using a codec appropriate for the corresponding format.

The resource manager 244 manages resources such as a source code, a memory, or a storage space of at least one application of the applications 270.

The power manager 245 operates together with a Basic Input/Output System (BIOS), so as to manage a battery or power and provides power information required for the operation of the electronic device 101.

The database manager 246 generates, searches for, or changes a database to be used by at least one of the applications 270.

The package manager 247 manages the installation or updating of applications 270 distributed in the form of a package file.

The connectivity manager 248 manages wireless connections, such as Wi-Fi or Bluetooth.

The notification manager 249 displays or notifies a user of an event, such as a received message, an appointment, a proximity notification, and the like.

The location manager 250 manages location information of the electronic device 101.

The graphic manager 251 manages graphic effects to be provided to a user and user interfaces related to the graphic effects.

The security manager 252 provides various security functions required for system security or user authentication.

When the electronic device 101 has a call function, the middleware 230 may further include a telephony manager for managing a voice call function or a video call function of the electronic device 101.

The middleware 230 includes a middleware module for forming a combination of various functions of the aforementioned components. The middleware 230 provides a module specialized for each type of operating system in order to provide a differentiated function. In addition, a few existing components may be dynamically removed from the middleware 230, or new components may be added to the middleware 230.

The API 260 (for example, the API 145), which is a set of API programming functions, may be provided in a different configuration for each operating system. For example, in a case of Android or iOS, one API set may be provided for each platform. Further, in a case of Tizen, two or more API sets may be provided for each platform.

The applications 270 (for example, the application programs 147) includes, for example, one or more applications which can provide functions such as home 271, dialer 272, SMS/MMS 273, Instant Message (IM) 274, browser 275, camera 276, alarm 277, contacts 278, voice dialer 279, email 280, calendar 281, media player 282, album 283, clock 284, health care (for example, measure exercise quantity or blood sugar level), or environment information (for example, atmospheric pressure, humidity, or temperature information).

The applications 270 may include an application supporting information exchange between the electronic device 101 and the first external electronic device 102 or the second external electronic device 104 (hereinafter, referred to as an "information exchange application"). The information exchange application includes, for example, a notification relay application for transmitting predetermined information to the external electronic device, or a device management application for managing the external electronic device.

For example, the notification relay application includes a function of transferring, to the first external electronic device 102 or the second external electronic device 104, notification information generated from other applications of the electronic device 101 (for example, an SMS/MMS application, an e-mail application, a health management application, or an environmental information application). Further, the notification relay application receives notification information from the first external electronic device 102 or the second external electronic device 104 and provides the received notification information to a user.

The device management application manages (for example, installs, deletes, and updates), for example, a function for at least a part of the first external electronic device 102 or the second external electronic device 104 communicating with the electronic device 101 (for example, turning on/off the external electronic device itself (or some elements thereof) or adjusting brightness (or resolution) of a display), applications executed in the first external electronic device 102 or the second external electronic device 104, or services provided from the first external electronic device 102 or the second external electronic device 104 (for example, a telephone call service or a message service).

The applications 270 may include an application (for example, health management application) designated according to attributes (for example, attributes of the electronic device such as the type of electronic device which corresponds to a mobile medical device) of the first external electronic device 102 or the second external electronic device 104.

The applications 270 may include an application received from the first external electronic device 102, the second external electronic device 104 or the server 106.

The applications 270 may include a preloaded application or a third party application which can be downloaded from the server 106. Names of the components of the program module 210 according to the above-described embodiments may be changed according to the type of OS.

At least some of the program module 210 may be implemented in software, firmware, hardware, or a combination of two or more thereof. At least some of the programming module 210 may be implemented or executed by the processor (for example, the AP 210). At least some of the programming module 210 may include a module, program, routine, sets of instructions, process, or the like for performing one or more functions.

Hereinafter, the electronic device 101 will be referred to as the first electronic device 101, the first external electronic device 102 will be referred to as the second electronic device 102, and the second external electronic device 104 will be referred to as the third electronic device 104.

Figure 3:
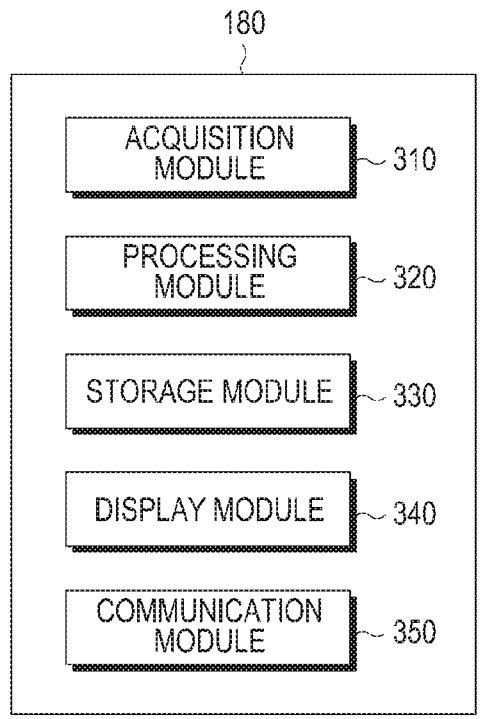
FIG. 3 is a block diagram of a connection determination module of an electronic device, according to an embodiment of the present disclosure.

FIG. 3 is a block diagram of a connection determination module of an electronic device, according to an embodiment of the present disclosure.

Referring to FIG. 3, a connection determination module 180 is provided. The connection determination module 180 includes at least some or all of an acquisition module 310, a processing module 320, a storage module 330, a display module 340, and a communication module 350. The connection determination module 180 may be provided separately from the processor 120 or may be entirely or partially integrated into the processor 120. The acquisition module 301 acquires second device information on the second electronic device 102 connected to the first electronic device 101.

The processing module 320 determines a first application corresponding to a combination of the first electronic device 101 and the second electronic device 102, based on first device information on the first electronic device 101 and the second device information of the second electronic device 102.

The display module 340 outputs a user interface related to the first application.

The communication module 350 downloads the first application from the server 106.

The processing module 320 determines application attributes and controls the storage module 330 to store relevant information on a correlation between the application and corresponding hardware based on the determined attributes.

The processing module 320 compares the first electronic device 101 information and the second electronic device 102 information with the relevant information to determine the first application.

The acquisition module 310 may acquire third device information on a third electronic device 104 connected to the second electronic device 102. In this case, the processing module 320 determines the first application based on the first device information, the second device information, and the third device information.

The processing module 320 analyzes a user status based on the first device information and the second device information and determines the first application according to the user status.

The processing module 320 determines a state similar to the user status and determines the first application corresponding to the similar state.

The acquisition module 310 acquires a first distance between the first electronic device 101 and the second electronic device 102. The processing module 320 determines the first application based on the first distance.

The acquisition module 310 may acquire a second distance between the first electronic device 101 and the third electronic device 104. In this case, the processing module 320 determines the first application based on a result of the comparison between the first distance and the second distance.

The acquisition module 310 acquires the second device information on the second electronic device 102 connected to the first electronic device 101. The processing module 320 controls the communication module 350 to transmit the first device information on the first electronic device 101 and the second device information to the server 106. The communication module 350 receives application information corresponding to the first device information and the second device information from the server 106.

The communication module 350 transmits an identifier including the first device information and the second device information to the server 106.

The processing module 320 controls the operation of the first electronic device 101 based on the application information.

The processing module 320 monitors whether the second electronic device 102 is connected to the first electronic device 101. The processing module 320 determines an operation mode of the first electronic device 101 as one of an independent operation mode and an interworking operation mode in which the first electronic device 101 interworks with the second electronic device 102 based on a result of the monitoring.

When the acquisition module 310 detects a connection of the second electronic device 102 to the first electronic device 101, the processing module 320 determines the operation mode of the first electronic device 101 as the interworking operation mode.

When the acquisition module 310 detects a release of the connection the first electronic device 101 and the second electronic device 102, the processing module 320 determines the operation mode of the first electronic device 101 as the independent operation mode.

The acquisition module 310 may acquire device information on another electronic device connected to the first electronic device 101. The processing module 320 controls the first electronic device 101 based on a combination of the first electronic device 101 and the other electronic device.

Figure 4:
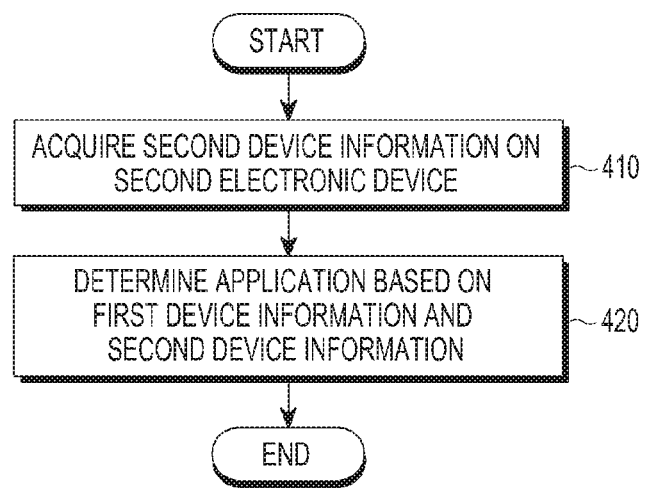
FIG. 4 is a flowchart of a control method of a first electronic device, according to an embodiment of the present disclosure.

FIG. 4 is a flowchart of a control method of a first electronic device, according to an embodiment of the present disclosure.

Referring to FIG. 4, in step 410, the first electronic device 101 acquires second device information on the second electronic device 102 connected to the first electronic device 101. The connection between the first electronic device 101 and the second electronic device 102 may refer to a wired connection or a physical connection between the first electronic device 101 and the second electronic device 102 or may refer to a wireless connection between the devices.

In the case of the wired or physical connection, the first electronic device 101 includes an input/output interface which is connected to the second electronic device 102, and the second electronic device 102 also includes an input/output interface which is connected to the first electronic device 101. In this case, the input/output interface of the first electronic device 101 and the input/output interface of the second electronic device 102 input/output data in a preset scheme. That is, the input/output interface of the first electronic device 101 and the input/output interface of the second electronic device 102 input/output data to each other based on the same scheme.

In the case of the wireless connection, the connection between the first electronic device 101 and the second electronic device 102 may refer to transmission/reception of data between the first electronic device 101 and the second electronic device 102 based on wireless communication. In this case, the first electronic device 101 includes a communication module which communicates with the second electronic device 102, and the second electronic device 102 also includes a communication module which communicates with the first electronic device 101. The communication module of the first electronic device 101 and the communication module of the second electronic device 102 input/output data to each other based on the same scheme.

The first electronic device 101 and the second electronic device 102 may be connected according to the aforementioned various schemes, and the first electronic device 101 acquires the device information on the connected second electronic device 102. The second device information may include at least one of a model number, manufacturer information, a module classification number, an MAC address, a device unique identifier (ID), service subscription state information, a device control authentication level, and a hardware module ID, as identification information on the second electronic device 102. The first device information is identification information on the first electronic device 101. The device information includes information on a place in which the electronic device is located and external environment information collected by the electronic device, as well as the identification information.

In step 420, the first electronic device 101 determines an application using the first electronic device 101 and the second electronic device 102 based on the first device information and the second device information. That is, the first electronic device 101 determines the application based on a combination of the first electronic device 101 and the second electronic device 102.

For example, it is assumed that the first electronic device 101 is a display device and the second electronic device 102 is a strap including a sensor. The first electronic device 101 detects a connection with the second electronic device 102. For example, the first electronic device 101 detects a coupling between a connection means of the first electronic device 101 and a connection means of the second electronic device 102 and, accordingly, detects the connection with the second electronic device 102. The first electronic device 101 acquires the second device information on the second electronic device 102, and determines that the second electronic device 102 is the strap including the sensor based on the second device information. The first electronic device 101 may determine, for example, a biometric signal display application corresponding to an application using the display device and the strap as the application which may be used by the combination of the first electronic device 101 and the second electronic device 102.

The first electronic device 101 may generate an identifier for the combined first device information and second device information. The first electronic device 101 determines an application based on the generated identifier. The identifier includes a combination of at least some of the first device information and at least some of the second device information.

As described above, the first electronic device 101 detects the connected second electronic device 102 and determines an application to be used based on a combination of the first electronic device 101 and the second electronic device 102. The number of second electronic devices 102 may be singular or plural. When the number of second electronic devices 102 is more than one, the first electronic device 101 may be connected to a plurality of second electronic devices 102 in parallel. More specifically, the first electronic device 101 may make a connection with one second electronic device 102 and separately make a connection with another second electronic device 102. In the case of a plurality of second electronic device 102, the first electronic device 101 determines an application to be used based on a combination of the first electronic device 101 and the plurality of second electronic device 102, that is, at least three electronic devices.

Figure 5:
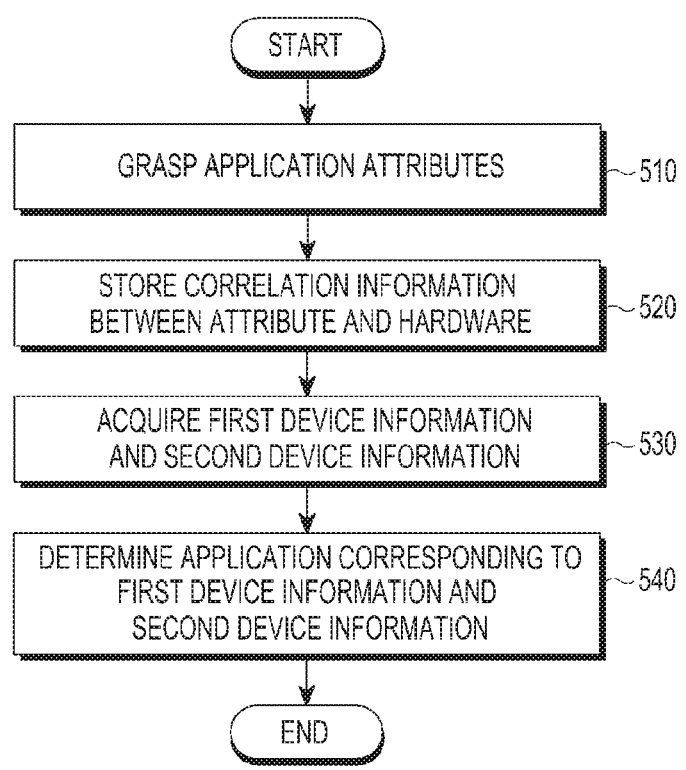
FIG. 5 is flowchart of a method of determining an application, according to an embodiment of the present disclosure.

FIG. 5 is flowchart of a method of determining an application, according to an embodiment of the present disclosure.

Referring to FIG. 5, in step 510, the first electronic device 101 may determine at least one application attribute. The application attribute includes hardware information used by the application. More specifically, the application attribute includes at least one of a hardware feature, capability, and a category used by the application. For example, the application may declare attributes of the hardware used by the application to the application manifest and the electronic device 101 may determine the attributes.

The hardware feature may be divided into, for example, a camera, an infrared camera, a GPS module, an NFC module, a sensor module, a telephony module, and a Wi-Fi module.

The category may be classified into, for example, health, exercise, game, education, finance, weather, news, sports, task efficiency, music, camera font, and theme.

In step 520, the first electronic device 101 stores correlation information indicating a correlation between the application attribute and the hardware. For example, the first electronic device 101 stores correlation information indicating a correlation between the application and corresponding hardware as shown in Table 1.

TABLE 1

| Application | Used hardware information |
|---|---|
| First application | First hardware and fourth hardware |
| Second application | Second hardware and third hardware |
| Third application | First hardware and fifth hardware |

Table 2 shows correlation information when the application is managed by an identifier rather than the used hardware information.

TABLE 2

| Application | Identifier |
|---|---|
| First application | device1\|\|device4 |
| Second application | device2\|\|device3 |
| Third application | device1\|\|device5 |

Although it has been described that the first electronic device 101 acquires and stores the correlation information shown in Table 1, it is only an example. The first electronic device 101 may receive the correlation information from another electronic device, or the first electronic device 101 may not manage the correlation information and another electronic device determines an application based on the correlation information. A configuration in which another electronic device, for example, a server 106 determines an application based on correlation information will be described below in more detail.

In step 530, the first electronic device 101 acquires the second device information and, accordingly, acquires a combination of the first device information and the second device information.

Alternatively, an identifier may be generated based on the first device information and the second device information. Referring to FIG. 5, it is assumed that the first electronic device 101 is first hardware and the second electronic device 102 is fifth hardware. In this case, the first electronic device 101 generates an identifier of "device1\|\|device5", for example. In the identifier, "device 1" refers to identification information on the first hardware and "device5" may be identification information on the fifth hardware. It should be understood by those skilled in the art that there is no limitation on the form of identifier such as "device1\|\|device5".

The first electronic device 101 stores "device5\|\|device1" as an identifier corresponding to a third application. When a plurality of hardware corresponds to the application, the first electronic device 101 stores correlation information in which all permutations of pieces of identification information of the plurality of hardware correspond to the application.

In step 540, the first electronic device 101 determines a corresponding application based on the first device information and the second device information.

The first electronic device 101 determines that the first electronic device 101 and the second electronic device 102 are the first hardware and the fifth hardware, respectively, based on the first device information and the second device information. Further, the first electronic device 101 determines the third application corresponding to the application using the first hardware and the fifth hardware as the application to be used, from the correlation information shown in Table 1.

Alternatively, the first electronic device 101 may determine the third application corresponding to the identifier "device1\|\|device5" as the application to be used based on the correlation information shown in Table 2.

The first electronic device 101 may then transmit the first device information and the second device information to another electronic device, for example, the server 106. This will be described below in more detail with reference to FIG. 6. According to the above description, the first electronic device 101 determines the application to be used in accordance with the combination of the first electronic device 101 and the connected second electronic device 102.

Figure 6:
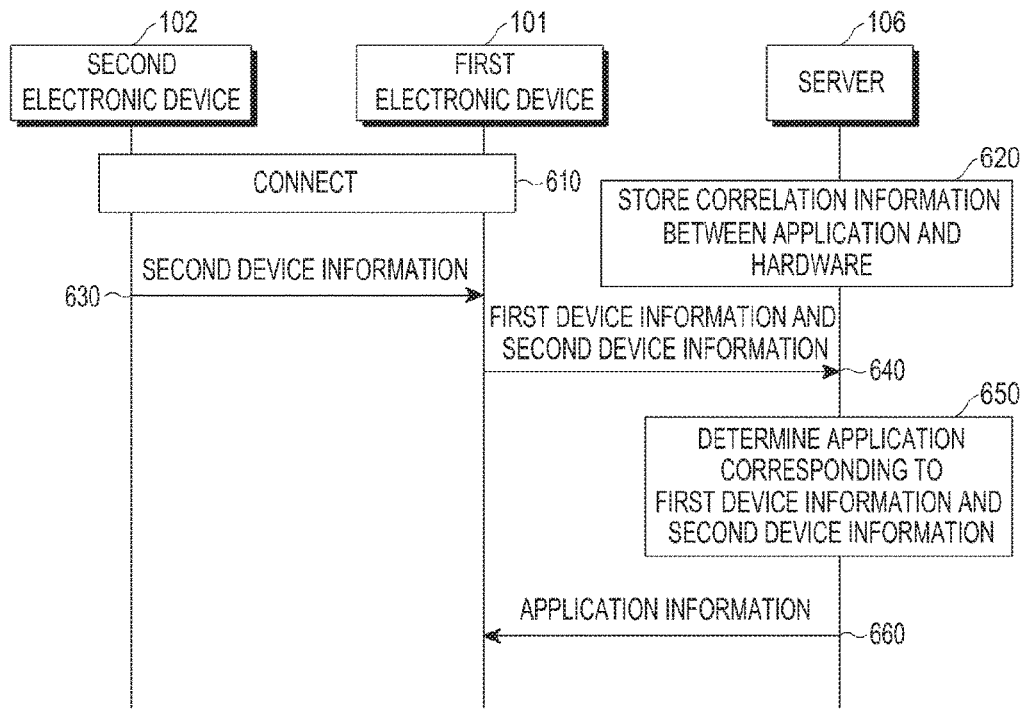
FIG. 6 is a flowchart illustrating a method of determining an application, according to an embodiment of the present disclosure.

FIG. 6 is a flowchart illustrating a method of determining an application, according to an embodiment of the present disclosure.

Referring to FIG. 6, step 610, the first electronic device 101 and the second electronic device 102 connect to each other. As described above, the first electronic device 101 and the second electronic device 102 may be connected in various schemes such as a wired connection, a hardware interface, wireless communication, and the like.

In step 620, the server 106 stores correlation information between the application and corresponding hardware in advance. The server 106 may register one application and determine a hardware feature and a category of the application when registering the application. The server 106 acquires hardware information required for executing the application based on at least one of the hardware feature and the category of the application. The server 106 stores correlation information on a correlation between the application and corresponding piece of hardware.

Alternatively, the server 106 may store correlation information on a correlation between the application and identification information on the corresponding piece of hardware. The identification information on the hardware may include various permutations of identification information on at least one piece of hardware.

In step 630, the first electronic device 101 acquires the second device information from the second electronic device 102.

In step 640, the first electronic device 101 transmits the first device information on the first electronic device 101 and the second device information to the server 106. Alternatively, the first electronic device 101 may generate an identifier based on the first device information and the second device information and transmit the generated identifier to the server 106.

In step 650, the server 106 determines an application corresponding to the first device information and the second device information. For example, the server 106 determines an application used by both the first electronic device 101 and the second electronic device 102 based on the first device information and the second device information. Alternatively, the server 106 determines an application corresponding to the received generated identifier.

The server 106 determines an application based on the stored correlation information. The server 106 determines an application corresponding to the first device information and the second device information based on the correlation information. Alternatively, the server 106 determines an application corresponding to the identifier based on the correlation information.

In step 660, the server 106 transmits application information on the determined application to the first electronic device 101. The server 106 may transmit the determined application to the first electronic device 101. Alternatively, the server 106 may receive an application download request from the first electronic device 101 and transmit the corresponding application to the first electronic device 101 in response to the received download request. In this case, in addition to the corresponding application, the server 106 may also transmit library information for an operation of the corresponding application to the first electronic device 101.

Figure 7:
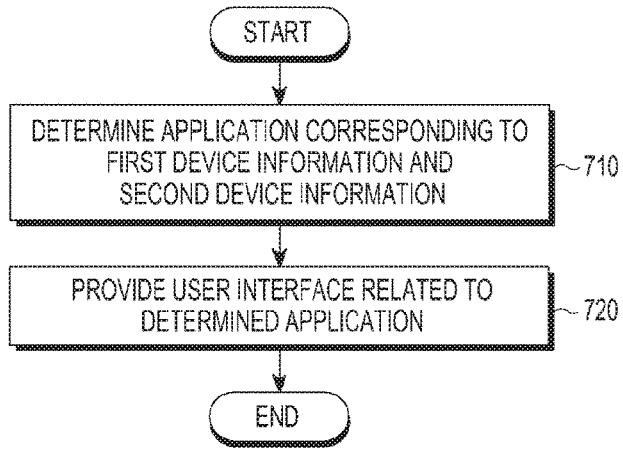
FIG. 7 is a flowchart of an operation of an electronic device corresponding to a determined application, according to an embodiment of the present disclosure.

FIG. 7 is a flowchart of an operation of an electronic device corresponding to a determined application, according to an embodiment of the present disclosure.

Referring to FIG. 7, in step 710, the first electronic device 101 determines the application corresponding to the first device information and the second device information. For example, the first electronic device 101 determines the first device information and the second device information based on pre-stored correlation information of the application and the corresponding hardware. Alternatively, the first electronic device 101 may transmit the first device information and the second device information to another electronic device (for example, the server 106) and receive application information corresponding to the first device information and the second device information from the other electronic device.

In step 720, the first electronic device 101 provides a user interface related to the determined application. For example, the first electronic device 101 displays an execution icon of the determined application. The first electronic device 101 may execute the determined application when the execution icon of the determined application is selected. Alternatively, the first electronic device 101 may directly execute the determined application.

When the number of determined applications is plural, the first electronic device 101 displays a screen including icons corresponding to the plurality of determined applications, respectively. Alternatively, the first electronic device 101 displays a selection window for requesting selection of one of the plurality of determined applications.

Accordingly, the first electronic device 101 allows the user to easily identify the application suitable for a combination of the first electronic device 101 and the second electronic device 102.

Figure 8A:
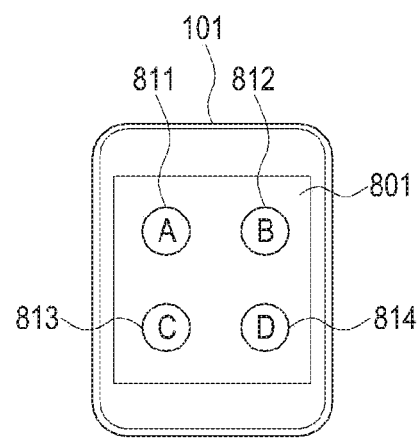
FIGS. 8A and 8B are conceptual diagrams illustrating an operation based on a connection between a first electronic device and a second electronic device, according to an embodiment of the present disclosure.
Figure 8B:
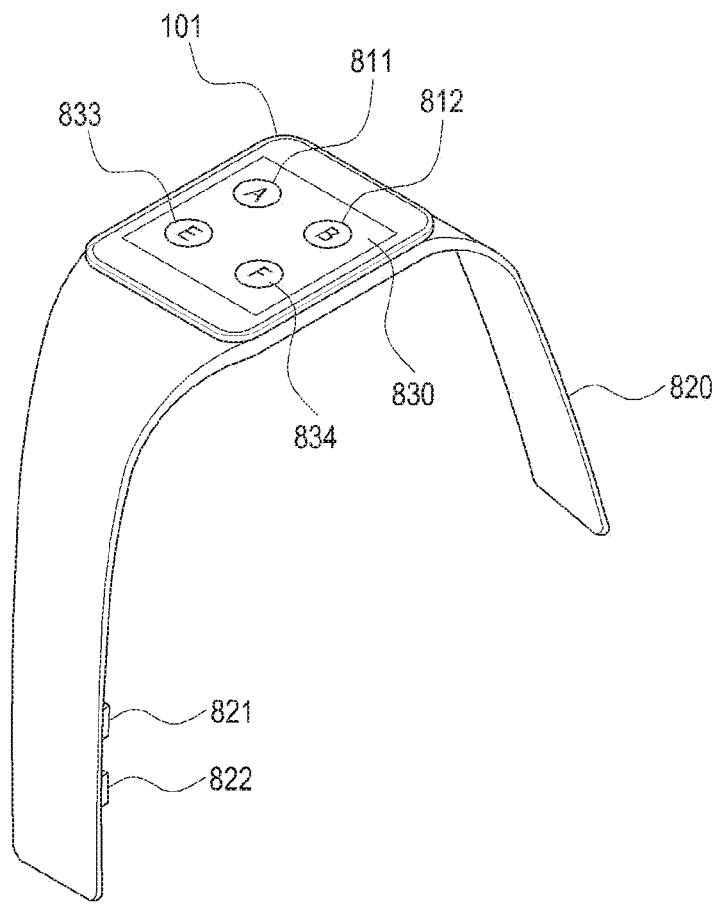

FIGS. 8A and 8B are conceptual diagrams illustrating an operation based on a connection between a first electronic device and a second electronic device, according to an embodiment of the present disclosure.

Referring to FIG. 8A, a first electronic device 101 is provided. The first electronic device 101 is a display device. The first electronic device 101 displays an icon 811 corresponding to a first application (A), an icon 812 corresponding to a second application (B), an icon 813 corresponding to a third application (C), an icon 814 corresponding to a fourth application (D), and a menu screen 801. The menu screen 801 may be also referred to as a launch application execution screen.

Referring to FIG. 8B, the first electronic device 101 and a second electronic device 820 is provided. The first electronic device 101 is connected to a second electronic device 820. The second electronic device 820 is a strap which may be worn on the user's wrist. The second electronic device 820 includes sensor modules 821 and 822, such that when the second electronic device 820 senses the user's biometric information when it is worn on the user's wrist.

The first electronic device 101 may include a connection means or an interface which may be connected to the second electronic device 820. The second electronic device 820 may also include a connection means and an interface which may be connected to the first electronic device 101. The connection means or the interface of the first electronic device 101 and the connection means or the interface of the second electronic device 820 may correspond to each other.

The first electronic device 101 detects a connection with the second electronic device 820 and acquires second device information on the second electronic device 820, according to the connection. The electronic device 101 determines a fifth application (E) and a sixth application (F), which are applications using the first electronic device 101 and the second electronic device 102, based on the first device information on the first electronic device 101 and the second device information on the second electronic device 820. For example, the fifth application (E) may be a biometric signal display application which may use both the display device corresponding to the first electronic device 101 and the strap including the sensor modules corresponding to the second electronic device 102.

The first electronic device 101 provides a user interface related to the fifth application (E) and the sixth application (F) which are the determined applications. For example, as illustrated in FIG. 8B, the first electronic device 101 displays an icon 833 corresponding to the fifth application (E) and an icon 834 corresponding to the sixth application (F). The first electronic device 101 may directly execute and display the fifth application (E).

Figure 9A:
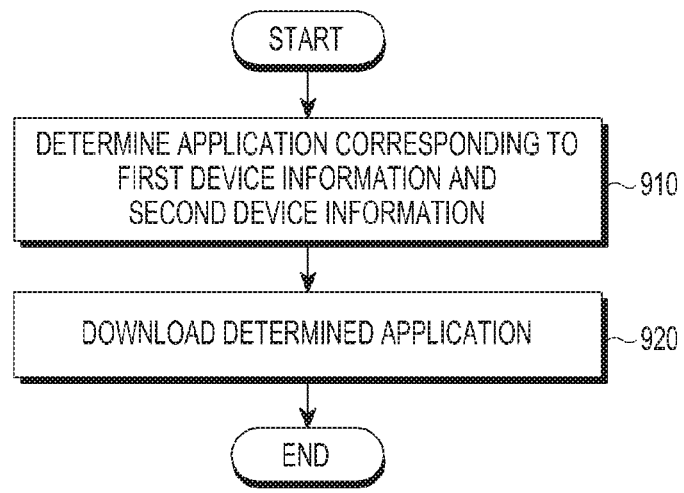
FIGS. 9A and 9B are flowcharts of processes of downloading an application, according to an embodiment of the present disclosure.
Figure 9B:
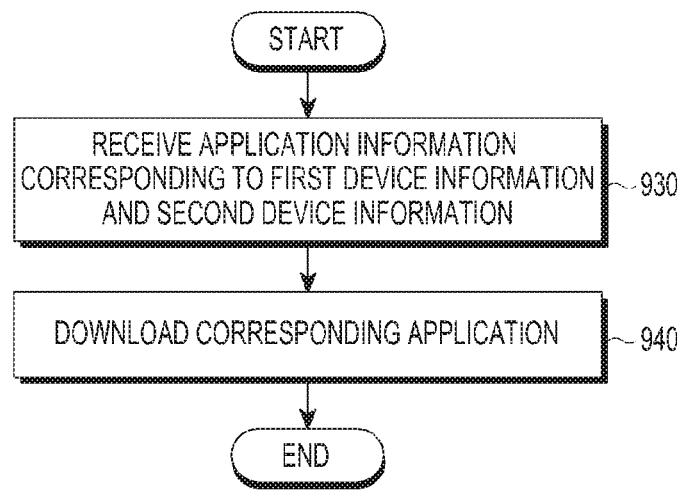

FIGS. 9A and 9B are flowcharts of processes of downloading an application, according to an embodiment of the present disclosure.

Referring to FIG. 9A, in step 910, the first electronic device 101 determines the application corresponding to the first device information and the second device information. For example, the first electronic device 101 determines the first device information and the second device information based on pre-stored correlation information of the application and the corresponding hardware. In this case, the first electronic device 101 does not pre-store the application, but receives correlation information from the server 106.

In step 920, the first electronic device 101 downloads the determined application from the server 106.

Referring to FIG. 9B, alternatively, in step 930, the first electronic device 101 transmits the first device information and the second device information to another electronic device (for example, the server 106) and receives application information corresponding to the first device information and the second device information from the other electronic device.

In operation 940, the first electronic device 101 downloads the determined application from the other electronic device.

Figure 10A:
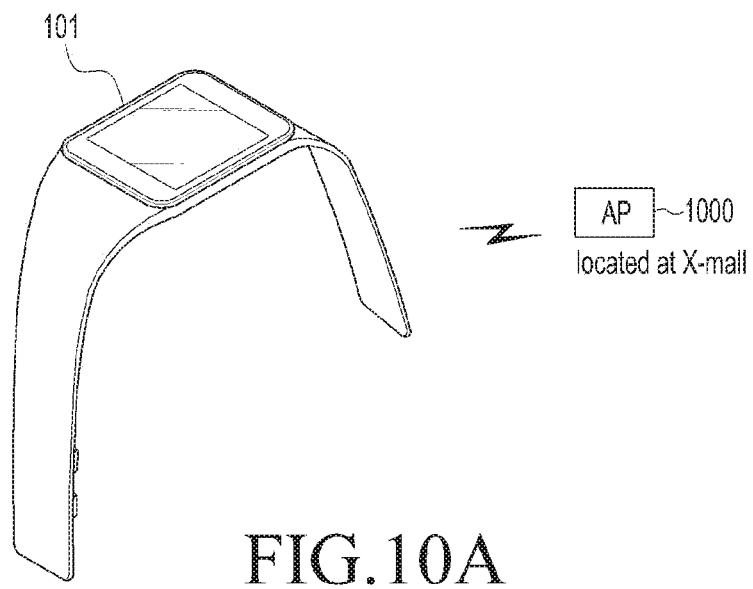
FIGS. 10A and 10B are conceptual diagrams illustrating control of an electronic device based on place information on a connected electronic device, according to an embodiment of the present disclosure.
Figure 10B:
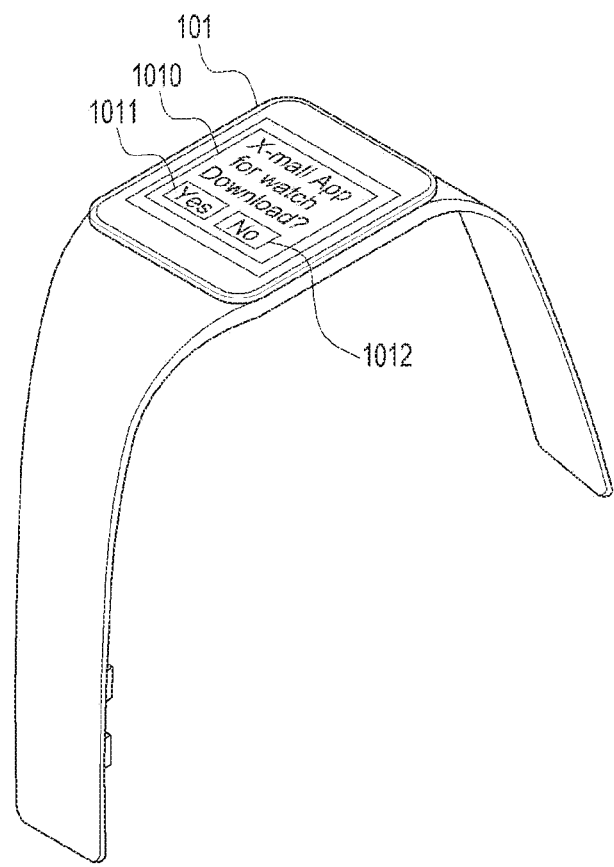

FIGS. 10A and 10B are conceptual diagrams illustrating control of an electronic device based on place information on a connected electronic device, according to an embodiment of the present disclosure.

Referring to FIGS. 10A and 10B, a first electronic device 101 and a second electronic device 1000 are provided. The first electronic device 101 is connected to the second electronic device 1000. As illustrated in FIG. 10A, the first electronic device 101 is a smart watch and the second electronic device 1000 is an Access Point (AP). In this case, the first electronic device 101 wirelessly forms a communication connection with the second electronic device 1000. The first electronic device 101 detects the connection with the second electronic device 1000 and acquires second device information on the second electronic device 1000. The second device information includes information on a place in which the second electronic device 1000 is located, as well as identification information on the second electronic device 1000. For example, the second electronic device 1000 may be located in a place of "X-mall".

The first electronic device 101 determines the application corresponding to the first device information and the second device information. Alternatively, the first electronic device 101 transmits the first device information and the second device information to the server 106 and the server 106 determines the application corresponding to the first device information and the second device information. Particularly, the server 106 determines the corresponding application based on the information on the place in which the second electronic device 1000 is located, which corresponds to the second device information.

The server 106 determines an application of "X-mall App" corresponding to the information on the place "X-mall" in which the second electronic device 1000 is located. Particularly, the server 106 determines "X-mall App" for a smart watch, which corresponds to the first electronic device 101, based on the first device information. The server 106 transmits application information on the determined application to the first electronic device 101. The first electronic device 101 provides a user interface related to the application based on the received application information. For example, as illustrated in FIG. 10B, the first electronic device 101 displays an inquiry window 1010 for inquiring whether to download the application "X-mall App" for the smart watch. The inquiry window 1010 includes a download acceptance icon 1011 and a download rejection icon 1012. For example, when the acceptance icon 1011 is selected, the first electronic device 101 downloads the application "X-mall App" for the smart watch from the server 106.

Figure 11A:
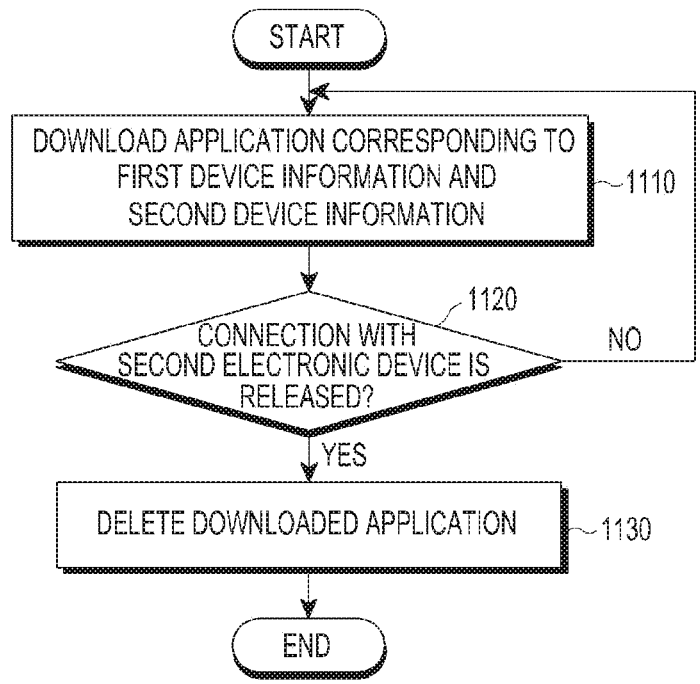
FIGS. 11A and 11B are flowcharts of control methods of an electronic device, according to an embodiment of the present disclosure.
Figure 11B:
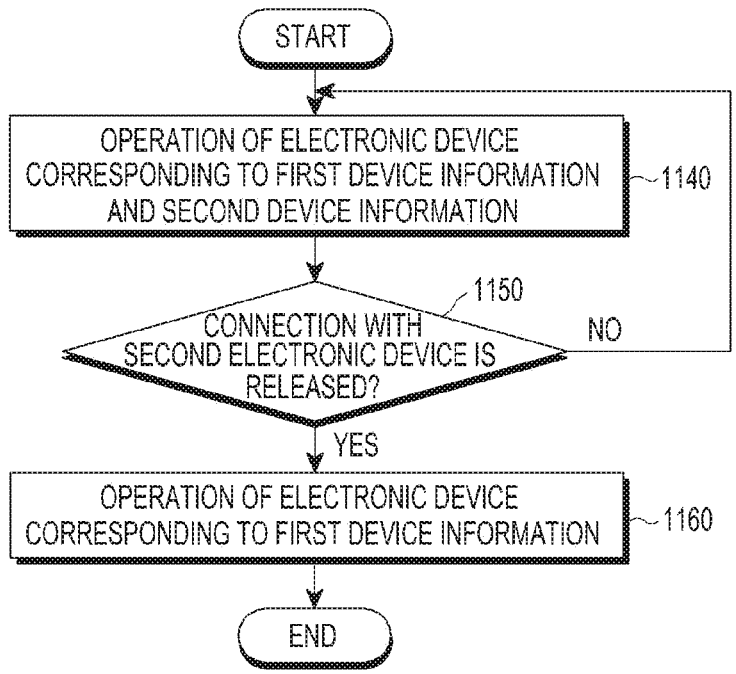

FIGS. 11A and 11B are flowcharts of control methods of an electronic device, according to an embodiment of the present disclosure.

Referring to FIG. 11A, in step 1110, the first electronic device 101 downloads the application corresponding to the first device information and the second device information from the server 106. Since the process in which the first electronic device 101 downloads the application from the server 106 has been described in detail, further description will be omitted herein.

In step 1120, the first electronic device 101 may detect a release of the connection with the second electronic device 1000. For example, in an embodiment of FIG. 10A, as a distance between the first electronic device 101 and the second electronic device 1000 becomes longer, the communication connection between the first electronic device 101 and the second electronic device 1000 may be released. The first electronic device 101 may be handed over to another AP, that is, the first electronic device 101 may leave a place in which the second electronic device 1000 is located.

When the release of the connection between the first electronic device 101 and the second electronic device 1000 is detected, the first electronic device 101 deletes the downloaded application "X-mall App" for the smart watch in step 1130. According to another embodiment, the first electronic device 101 may simply end the execution of the downloaded application "X-mall App" for the smart watch.

Referring to FIG. 11B, in step 1140, the first electronic device 101 operates in accordance with the first device information and the second device information. The first electronic device 101 may display icons of applications corresponding to the first electronic device 101 and the second electronic device 102, execute applications, or download applications.

In step 1150, the first electronic device 101 may detect a release of the connection with the second electronic device 102. For example, the first electronic device 101 may detect the release of the connection based on whether a connection means is connected to/disconnected from the second electronic device 102, whether a hardware interface is connected/disconnected, and a communication connection of the communication module is released.

In step 1160, the first electronic device 101 operates in accordance with the first device information. For example, the first electronic device 101 may delete or end the execution of a downloaded application. Alternatively, the first electronic device 101 may change a displayed application icon into another application icon and display the changed icon.

Figure 12:
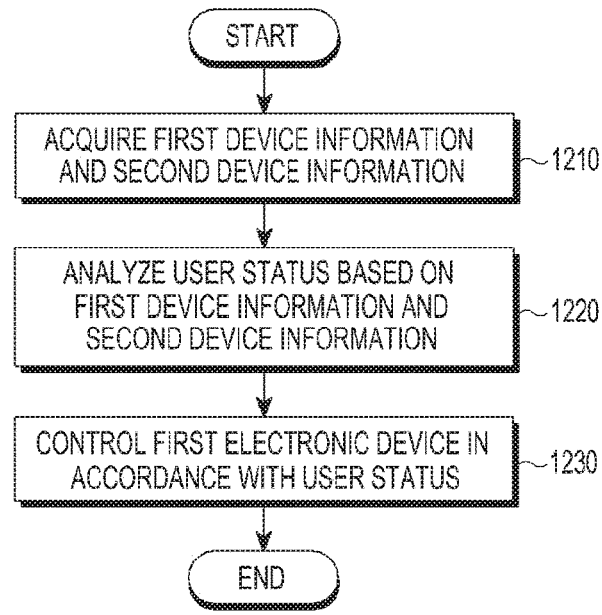
FIG. 12 is flowchart of a control method of an electronic device, according to an embodiment of the present disclosure.
Figure 13:
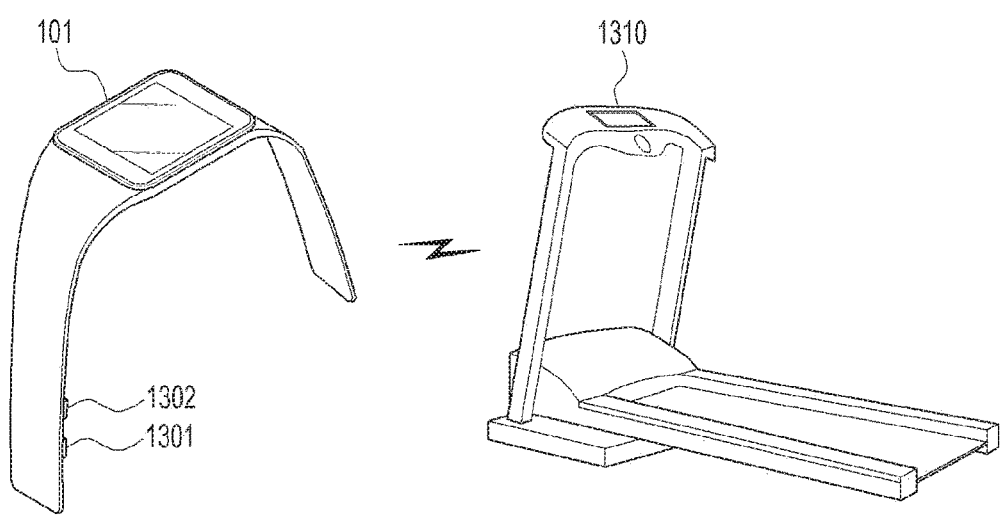
FIG. 13 is a conceptual diagram illustrating a connection between a first electronic device and a second electronic device, according to an embodiment of the present disclosure.

FIG. 12 is flowchart of a control method of an electronic device, according to an embodiment of the present disclosure. FIG. 13 is a conceptual diagram illustrating a connection between a first electronic device and a second electronic device, according to an embodiment of the present disclosure.

Referring to FIGS. 12 and 13, a first electronic device 101 and a second electronic device 1310 are provided. The first electronic device 101 is a smart watch and the second electronic device 1310 is a treadmill.

In step 1210, the first electronic device 101 acquires the first device information on the first electronic device 101 and the second device information on the second device 1310. For example, as illustrated in FIG. 13, the first electronic device 101 may form a communication connection with a second electronic device 1310. The first electronic device 101 acquires second device information on the second electronic device 1310 through the formed communication connection.

In step 1220, the first electronic device 101 analyzes a user status based on the first device information and the second device information. For example, the first electronic device 101 analyzes that the user status is an exercise status based on the first device information indicating that the first electronic device 101 is the smart watch including sensor modules 1301 and 1302 which may sense a biometric signal and information indicating that the second electronic device 102 is the treadmill.

The first electronic device 101 stores correlation information on a correlation between the hardware type and the user status. Table 3 shows examples of correlation information on the correlation between the hardware type and the user status.

TABLE 3

| User status | Used hardware information |
| --- | --- |
| Exercise status | First hardware and fourth hardware |
| Sleep status | Second hardware and third hardware |
| Work status | First hardware and fifth hardware |

Table 4 shows correlation information managed by an identifier, rather than the used hardware information.

TABLE 4

| User status | Identifier |
| --- | --- |
| Exercise status | device1\|\|device4 |
| Sleep status | device2\|\|device3 |
| Work status | device1\|\|device5 |

Although it has been described that the first electronic device 101 acquires and stores the correlation information shown in Tables 3 or 4, it is only an example. The first electronic device 101 may receive the correlation information from another electronic device, or the first electronic device 101 does not manage correlation information and another electronic device determines the user status based on the correlation information and then the first electronic device 101 receives the determined user status. For example, the first electronic device 101 may analyze that the user status is an exercise status based on the first device information and the second device information.

The first electronic device 101 may determine an application that is most frequently used or is most recently executed in the user status.

In step 1230, the first electronic device 101 controls the first electronic device 101 in accordance with the user status. For example, the first electronic device 101 stores a relation between the user status and the operation of the electronic device as shown in Table 5.

TABLE 5

| Application | Operation of electronic device |
| --- | --- |
| Exercise status | Sense biometric signal and execute first application |
| Sleep status | Sense biometric signal and execute wireless charging |
| Work status | Vibration status |

The first electronic device 101 performs an operation corresponding to the analyzed operation status. The first electronic device 101 may sense a biometric signal and execute a first application, for example, a biometric signal display application.

Figure 14:
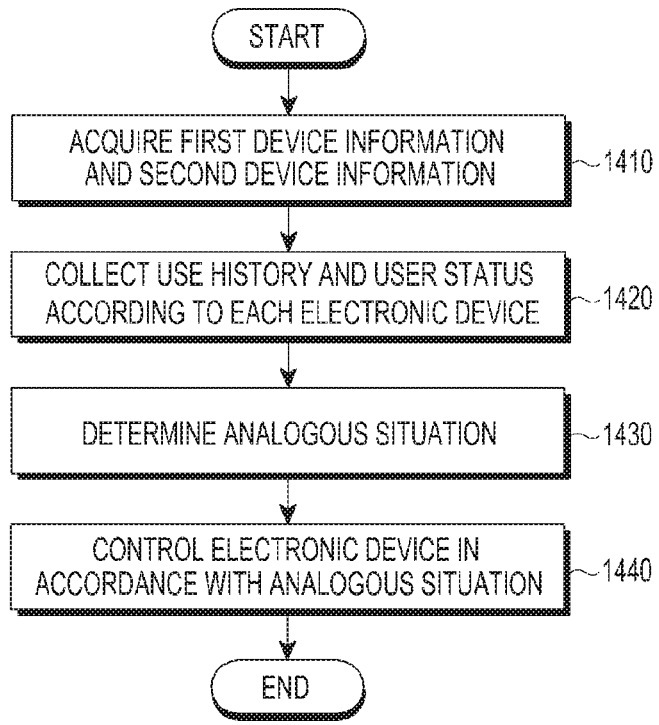
FIG. 14 is flowchart of a control method of an electronic device, according to an embodiment of the present disclosure.

FIG. 14 is flowchart of a control method of an electronic device, according to an embodiment of the present disclosure.

In step 1410, the first electronic device 101 acquires the first device information and the second device information.

In step 1420, the first electronic device 101 collects a use history and a user status according to each electronic device. For example, the first electronic device 101 collects the user status and used hardware information from at least one of the electronic device 101 and other electronic devices.

In step 1430, the first electronic device 101 determines hardware information similar to the first device information and the second device information and, accordingly, determines an analogous status which is similar to the user status. For example, the first electronic device 101 further stores rest status as user status. And the first electronic device 101 stores device 2, device 3 and device 6 as hardware information corresponding to the rest status as user status. The first electronic device 101 identifies the rest status as an analogous status to the sleep status based on similarity between hardware information of the rest status and hardware information of the user status. The first electronic device 101 identifies a control operation of the electronic device corresponding to the analogous status.

In step 1440, the first electronic device 101 controls the first electronic device 101 in accordance with the analogous status.

Although it has been described that the first electronic device 101 determines the analogous status, it is only an example. The server 106 may collect a use history and a user status according to each electronic device from at least one electronic device. In this case, the server 106 analyzes the collected use history and user status according to each electronic device and stores the analyzed use history and user status in connection with at least one analogous status and the control operation of the electronic device. The server 106 receives the first device information and the second device information from the first electronic device 101 and transmits information including at least one of the analogous statuses and the control operation of the electronic device to the first electronic device 101.

Figure 15:
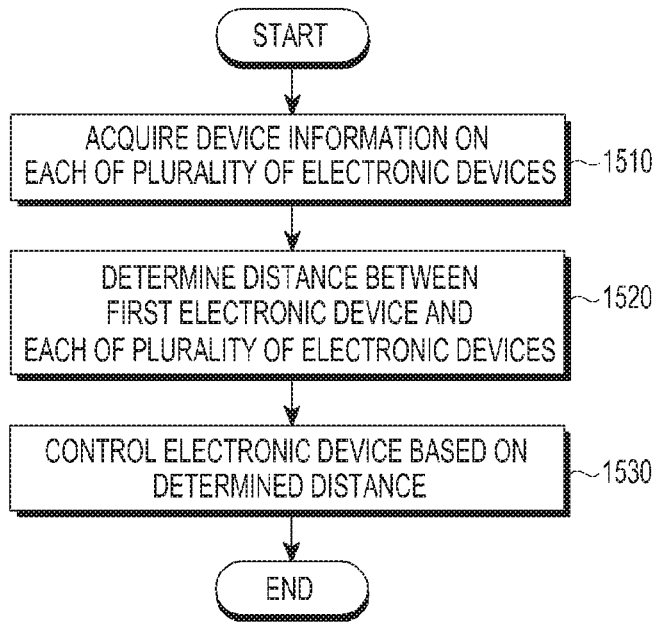
FIG. 15 is flowchart of a control method of an electronic device, according to an embodiment of the present disclosure.
Figure 16:
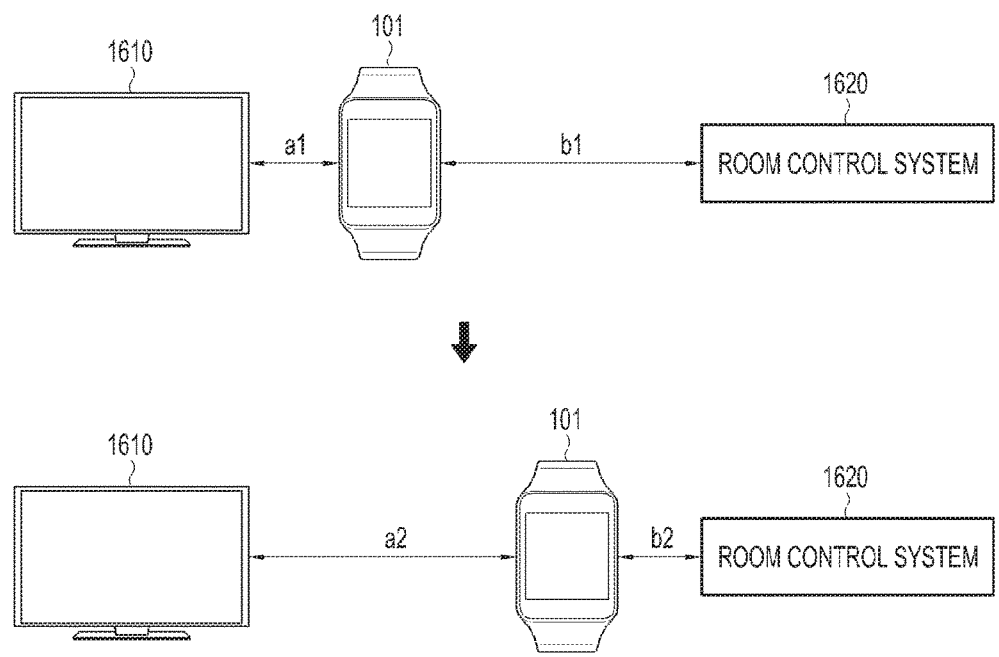
FIG. 16 is a conceptual diagram illustrating an operation of an electronic device, according to an embodiment of the present disclosure.

FIG. 15 is flowchart of a control method of an electronic device, according to an embodiment of the present disclosure. FIG. 16 is a conceptual diagram illustrating an operation of an electronic device, according to an embodiment of the present disclosure.

Referring to FIGS. 15 and 16, FIG. 15 will be described in more detail with reference to FIG. 16. A first electronic device 101, a second electronic device 1610, and a third electronic device 1620 are provided. The first electronic device 101 is a smart watch, the second electronic device 1610 is a TV, and the third electronic device 1620 is a room control system. The first electronic device 101 forms a communication connection with the second electronic device 1610 and a communication connection with the third electronic device 1620.

In step 1510, the first electronic device 101 acquires device information on each of a plurality of different electronic devices. For example, as illustrated in FIG. 16, the first electronic device 101 acquires a distance a1 between the first electronic device 101 and a second electronic device 1610, in step 1520. Further, the first electronic device 101 acquires a distance b1 between the first electronic device 101 and a third electronic device 1620. The first electronic device 101 acquires the distance a1 between the first electronic device 101 and the second electronic device 1610 based on a signal strength from the second electronic device 1610. The first electronic device 101 acquires the distance b1 between the first electronic device 101 and the third electronic device 1620 based on a signal strength from the third electronic device 1620.

In step 1530, the first electronic device 101 controls the first electronic device 101 based on the distance a1 between the first electronic device 101 and the second electronic device 1610 and the distance b1 between the first electronic device 101 and the third electronic device 1620.

For example, the first electronic device 101 may operate in accordance with a combination of the first electronic device 101 and the second electronic device 1610 when the second electronic device 1610 is located closer to the first electronic device 101. For example, the first electronic device 101 may execute a TV remote control application based on the smart watch and TV.

As illustrated in FIG. 16, the first electronic device 101 may move to a position which is a distance a2 from the second electronic device 1610 a distance b2 from the third electronic device 1620. For example, the user may move toward the third electronic device 1620 from the second electronic device 1610 in a state where the user wears the first electronic device 101.

In this case, the first electronic device 101 acquires a changed distance a2 between the first electronic device 101 and the second electronic device 1610. Further, the first electronic device 101 acquires a changed distance b2 between the first electronic device 101 and the third electronic device 1620. The first electronic device 101 controls the first electronic device 101 based on the distance a2 between the first electronic device 101 and the second electronic device 1610 and the distance b2 between the first electronic device 101 and the third electronic device 1620.

For example, the first electronic device 101 may operate in accordance with a combination of the first electronic device 101 and the third electronic device 1620 when the third electronic device 1620 is located closer to the first electronic device 101. For example, the first electronic device 101 may execute an electronic device remote control application within a room based on the smart watch and room control system.

Figure 17:
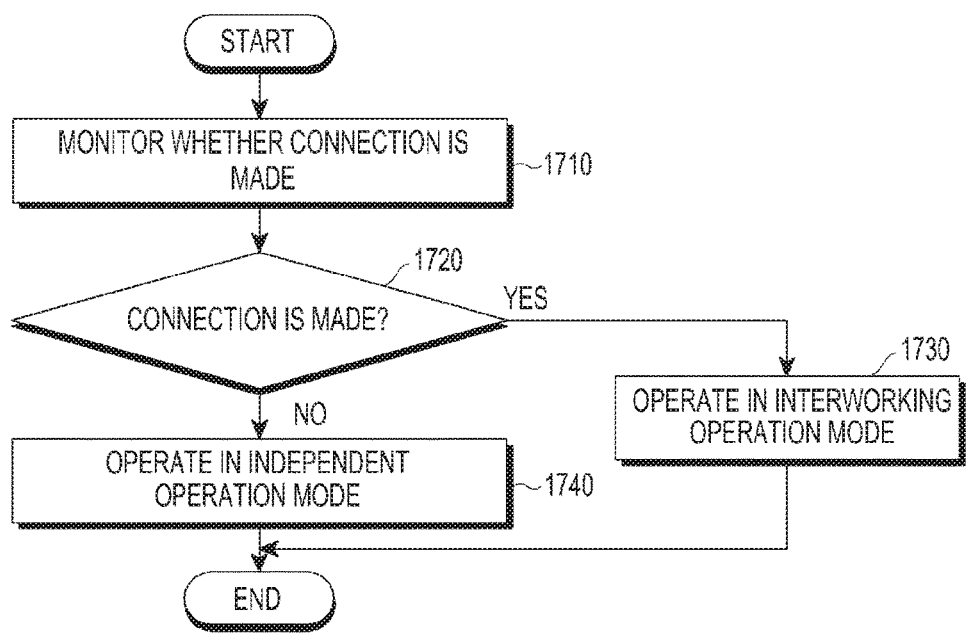
FIG. 17 is a flowchart of a control method of an electronic device, according to an embodiment of the present disclosure.

FIG. 17 is a flowchart of a control method of an electronic device, according to an embodiment of the present disclosure.

In step 1710, the first electronic device 101 monitors whether the second device 102 is connected to the first electronic device.

In step 1720, the first electronic device 101 determines an operation mode of the first electronic device 101 as an independent mode or an interworking mode in which the first electronic device 101 interworks with the second electronic device 102 based on a result of monitoring whether a connection is made. The interworking mode refers to a mode in which the first electronic device 101 and the second electronic device 102 interwork with each other while transmitting/receiving data. Alternatively, the interworking mode may refer to a mode in which the first electronic device 101 operates using data received from the second electronic device 102.

When it is determined that the second device 102 is connected, the first electronic device 101 operates in the interworking operation mode in step 1730. When it is determined that the second device 102 is not connected, the first electronic device 101 operates in the independent operation mode in step 1740.

Figure 18:
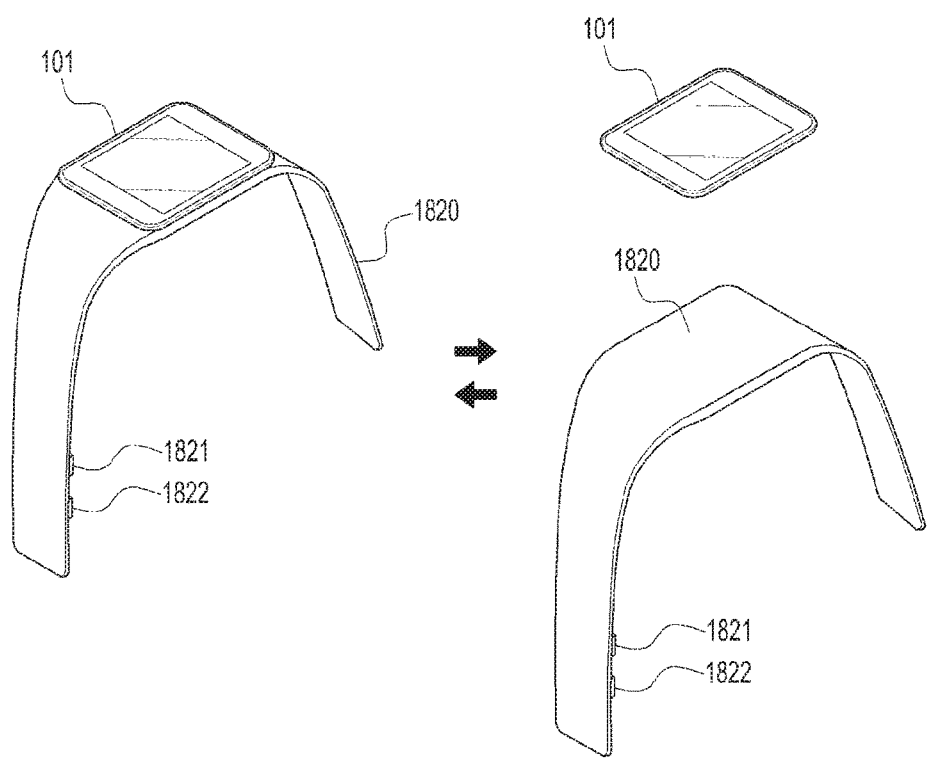
FIG. 18 is a conceptual diagram illustrating an independent operation mode and an interworking operation mode, according to an embodiment of the present disclosure.

FIG. 18 is a conceptual diagram illustrating an independent operation mode and an interworking operation mode, according to an embodiment of the present disclosure.

Referring to FIG. 18, a first device 101 and a second device 1820 are provided. The first electronic device 101 is a display device and the second electronic device 1820 is a strap which may be worn on the user's wrist. The second electronic device 1820 includes sensor modules 1821 and 1822 which may sense user's biometric information, when the second electronic device is worn on the user's wrist.

The first electronic device 101 determines that the first electronic device 101 is connected to the second electronic device 1820 and operates in the interworking operation mode. The second electronic device 1820 may also determine that the second electronic device 1820 is connected to the first electronic device 101 and operates in the interworking operation mode. Based on the interworking operation mode, the first electronic device 101 processes and displays biometric signals sensed by the sensor modules 1821 and 1822 of the second electronic device 1820. Based on the interworking operation mode, the second electronic device 1820 transmits the biometric signals sensed by the sensor modules 1821 and 1822 of the second electronic device 1820 to the first electronic device 101.

When the first electronic device 101 detects a release of the connection with the second electronic device 1820, each of the first electronic device 101 and the second electronic device 1820 operates in the independent operation mode. Based on the independent operation mode, the first electronic device 101 may display, for example, an image stored in the first electronic device 101. Based on the independent operation mode, the second electronic device 1820 may sense and store, for example, a user's biometric signal.

The first electronic device 101 may be re-connected to the second electronic device 1820. In this case, the first electronic device 101 operates in the interworking operation mode in accordance with the connection with the second electronic device 1820. The first electronic device 101 operates by receiving the biometric signals collected when the connection is released from the second electronic device 1820.

Figure 19A:
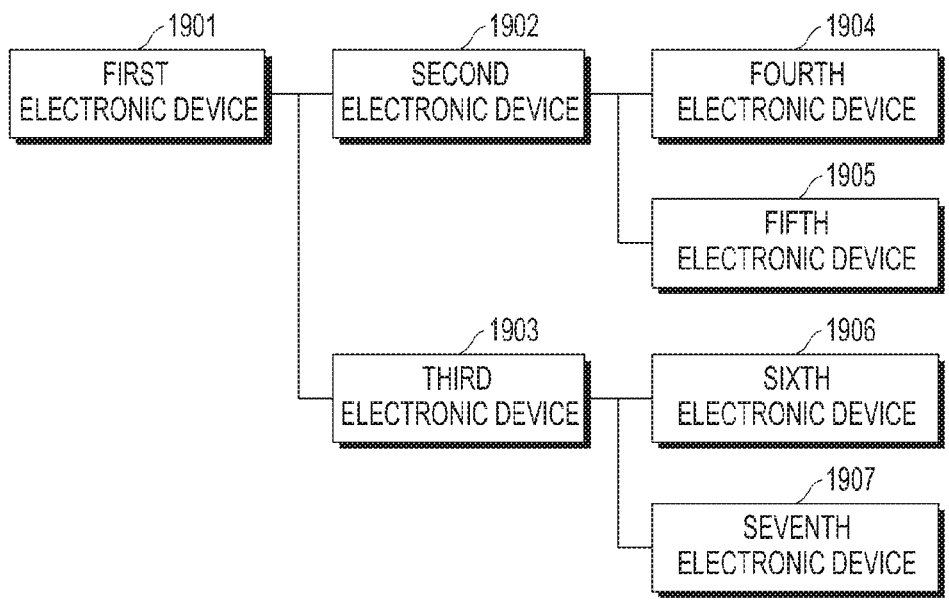
FIGS. 19A to 19C are conceptual diagrams illustrating serial connections between electronic devices, according to an embodiment of the present disclosure.
Figure 19B:
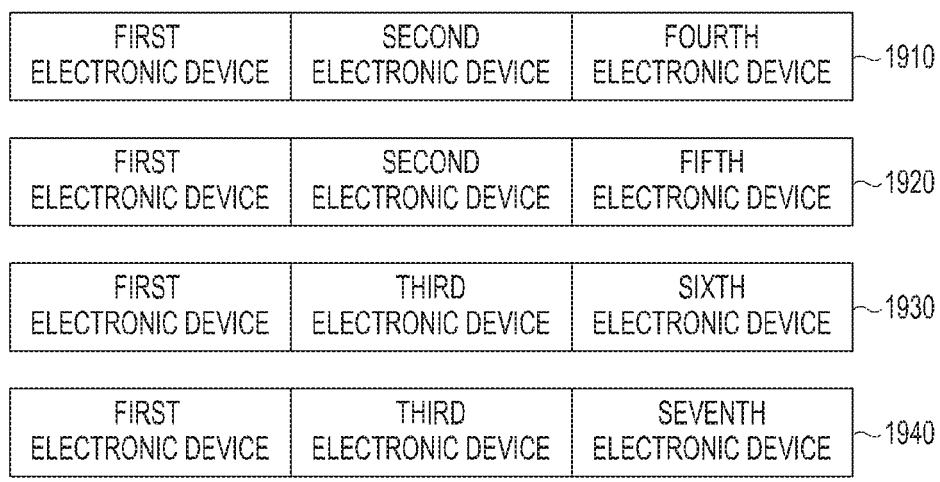
Figure 19C:
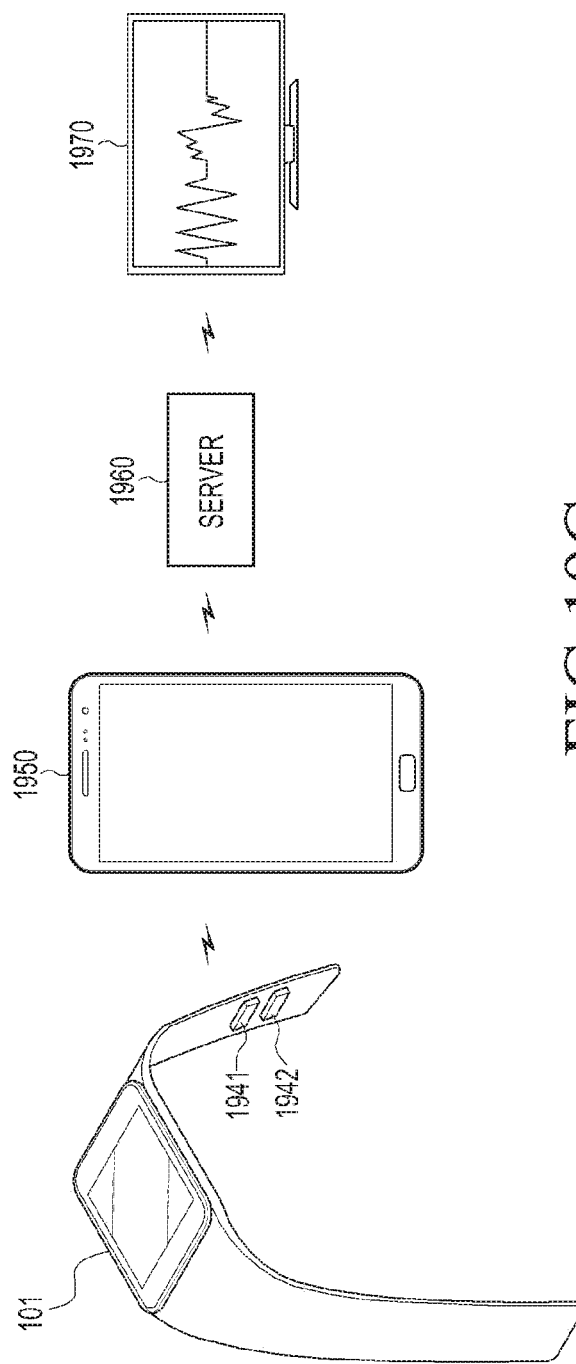

FIGS. 19A to 19C are conceptual diagrams illustrating serial connections between electronic devices, according to an embodiment of the present disclosure.

Referring to FIG. 19A, a first electronic device 1901 is connected to a second electronic device 1902 and a third electronic device 1903 in parallel. More specifically, the first electronic device 1901 is directly connected to the second electronic device 1902 and is directly connected to the third electronic device 1903. The second electronic device 1902 is directly connected to a fourth electronic device 1904 and a fifth electronic device 1905 in parallel. The third electronic device 1903 is directly connected to a sixth electronic device 1906 and a seventh electronic device 1907 in parallel. The first electronic device 1901 is connected to the fourth electronic device 1904 in series. That is, the first electronic device 1901 is connected to the fourth electronic device 1904 through the second electronic device 1902. The first electronic device 1901 acquires device information from each of the second electronic device 1902 to the seventh electronic device 1907.

Referring to FIG. 19B, the first electronic device 1901 may identify all of the permutations of combinations of the connected electronic devices. For example, the first electronic device may identify a first combination of electronic devices 1910 to a fourth combination of electronic devices 1940, as illustrated in FIG. 19B. The first combination 1910 includes a combination of the first electronic device 1901, the second electronic device 1902, and the fourth electronic device 1904. The second combination 1920 includes a combination of the first electronic device 1901, the second electronic device 1902, and the fifth electronic device 1905. The third combination 1930 includes a combination of the first electronic device 1901, the third electronic device 1903, and the sixth electronic device 1906. The fourth combination 1940 includes a combination of the first electronic device 1901, the third electronic device 1903, and the seventh electronic device 1907.

The first electronic device 1901 operates in accordance with the combination of electronic devices by the series connection.

Referring to FIG. 19C an example of the series connection of a first electronic device 100, a second electronic device 1950, a third electronic device 1960, and a fourth electronic device 1970 is provided.

As illustrated in FIG. 19C, the first electronic device 101 is connected to the second electronic device 1950. The second electronic device 1950 is connected to the third electronic device 1960 (for example, a server). The third electronic device 1960 is connected to the fourth electronic device 1970. The fourth electronic device 1970 acquires device information on the first electronic device 101 to the third electronic device 1960. The fourth electronic device 1970 determines an application corresponding to the first electronic device 101 to the fourth electronic device 1970.

For example, if the first electronic device 101 senses biometric signals through sensor modules 1941 and 1942, the fourth electronic device 1970 executes a biometric signal processing application as the application corresponding to the first electronic device 101 to the fourth electronic device 1970 and displays the processed application. The fourth electronic device 1970 may also display a result of the processing and analysis of the biometric signals sensed by the first electronic device 101.

A control method of a first electronic device includes acquiring second device information on a second electronic device connected to the first electronic device; and determining a first application corresponding to a combination of the first electronic device and the second electronic device based on first device information on the first electronic device and the second device information.

The control method of the first electronic device may further include outputting a user interface related to the first application.

The control method of the first electronic device may further include downloading the first application from a server.

The control method of the first electronic device may further include determining application attributes; and storing correlation information on a correlation between an application and corresponding hardware based on the determined attributes.

The determining of the first application may include determining the first application by comparing the first electronic device information and the second electronic device information with the correlation information.

The control method of the first electronic device may further include acquiring third device information on a third electronic device connected to the second electronic device; and determining the first application based on the first device information, the second device information, and the third device information.

The control method of the first electronic device may further include analyzing a user status based on the first device information and the second device information; and determining the first application in accordance with the user status.

The control method of the first electronic device may further include determining an analogous status similar to the user status; and determining the first application corresponding to the analogous status.

The control method of the first electronic device may further include acquiring a first distance between the first electronic device and the second electronic device; and determining the first application based on the first distance.

The control method of the first electronic device may further include acquiring a second distance between the first electronic device and the third electronic device; and determining the first application based on a result of the comparison between the first distance and the second distance.

A first electronic device may include a connection module that transmits/receives data to/from a second electronic device; and a processor that acquires second device information on the second electronic device connected to the first electronic device, and determines a first application corresponding to a combination of the first electronic device and the second electronic device based on first device information on the first electronic device and the second device information.

The first electronic device may further include a display module that outputs a user interface related to the first application.

The first electronic device may further include a communication module that downloads the first application from a server.

The processor may determine application attributes and control a storage module to store correlation information on a correlation between an application and corresponding hardware based on the determined attributes.

The processor may determine the first application by comparing the first electronic device information and the second electronic device information with the correlation information.

The processor may acquire third device information on a third electronic device connected to the second electronic device and determine the first application based on the first device information, the second device information, and the third device information.

The processor may analyze a user status based on the first device information and the second device information and determine the first application in accordance with the user status.

The processor may determine an analogous status similar to the user status and determine the first application corresponding to the analogous status.

The processor may acquire a first distance between the first electronic device and the second electronic device and determine the first application based on the first distance.

The processor may acquire a second distance between the first electronic device and the third electronic device and determine the first application based on a result of the comparison between the first distance and the second distance.

A control method of a first electronic device may include acquiring second device information on a second electronic device connected to the first electronic device; transmitting first device information on the first electronic device and the second device information to a server; and receiving application information corresponding to the first device information and the second device information from the server.

The transmitting of the first device information and the second device information to the server may include transmitting an identifier including the first device information and the second device information to the server.

The control method of the first electronic device may further include controlling an operation of the first electronic device based on the application information.

The first electronic device may include a processor that acquires second device information on a second electronic device connected to the first electronic device; and a communication module that transmits first device information on the first electronic device and the second device information to a server and receives application information corresponding to the first device information and the second device information from the server.

The communication module may transmit an identifier including the first device information and the second device information to the server.

The processor may control the operation of the first electronic device based on the application information.

A control method of a server communicating with a first electronic device may include receiving first device information on the first electronic device and second device information on a second electronic device connected to the first electronic device; determining application information corresponding to the first device information and the second device information; and transmitting the application information to the first electronic device.

The receiving of the first device information and the second device information may include receiving an identifier including the first device information and the second device information.

The control method of the server may further include determining application attributes; and storing correlation information on a correlation between an application and corresponding hardware based on the determined attributes.

The determining of the application information may include determining the application information by comparing the first electronic device information and the second electronic device information with the correlation information.

The control method of the server may further include receiving a download request for an application corresponding to the application information; and transmitting the application to the first electronic device in response to the download request.

A server communicating with a first electronic device may include a communication module that receives first device information on the first electronic device and second device information on a second electronic device connected to the first electronic device; and a processor that determines application information corresponding to the first device information and the second device information and controls the communication module to transmit the application information to the first electronic device.

The communication module may receive an identifier including the first device information and the second device information.

The processor may determine application attributes and control a storage module to store correlation information on a correlation between an application and corresponding hardware based on the determined attributes.

The processor may determine the application information by comparing the first electronic device information and the second electronic device information with the correlation information.

The communication module may receive a download request for an application corresponding to the application information, and the processor may control the communication module to transmit the application to the first electronic device in response to the download request.

A control method of a first electronic device may include monitoring whether a second electronic device is connected to the first electronic device; and determining an operation mode of the first electronic device as an independent operation mode or an interworking operation mode in which the first electronic device interworks with the second electronic device based on a result of the monitoring.

The control method of the first electronic device may further include detecting a connection of the second electronic device to the first electronic device; and determining the operation mode of the first electronic device as the interworking operation mode.

The control method of the first electronic device may further include detecting a release of the connection between the first electronic device and the second electronic device; and determining the operation mode of the first electronic device as the independent operation mode.

A first electronic device may include a communication module that communicates with a second electronic device; and a processor that monitors whether the second electronic device is connected to the first electronic device and determines an operation mode of the first electronic device as one of an independent mode and an interworking operation mode in which the first electronic device interworks with the second electronic device based on a result of the monitoring.

The processor may detect a connection of the second electronic device to the first electronic device and determines the operation mode of the first electronic device as the interworking operation mode.

The processor may detect a release of the connection between the first electronic device and the second electronic device and determine the operation mode of the first electronic device as the independent operation mode.

A control method of an electronic device may include acquiring device information on another electronic device connected to the electronic device; and controlling the electronic device based on a combination of the electronic device and the other electronic device.

An electronic device may include a connection module that transmits/receives data to/from another electronic device; and a processor that acquires device information on the other electronic device connected to the electronic device and controls the electronic device based on a combination of the electronic device and the other electronic device.

Figure 20:
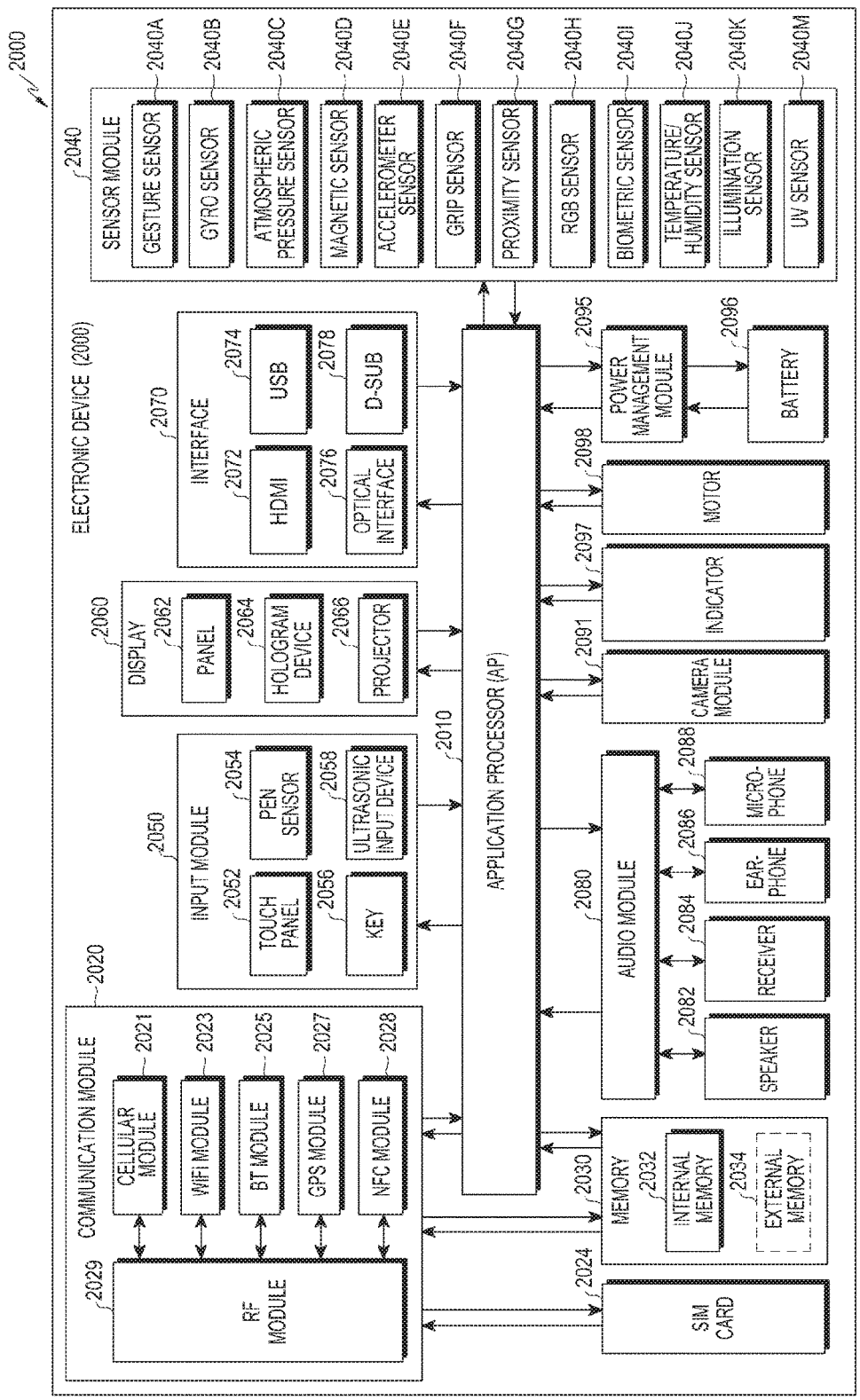
FIG. 20 is a block diagram of a configuration of an electronic device, according to an embodiment of the present disclosure.

FIG. 20 is a block diagram of a configuration of an electronic device, according to an embodiment of the present disclosure.

Referring to FIG. 20, an electronic device 2001 is provided. Electronic device 2001 may include all or some of the electronic device 101 illustrated in FIG. 1. For example, the electronic device 101 illustrated in FIG. 1 may include all or some of the electronic device 2001 illustrated in FIG. 20.

The electronic device 2001 includes at least one Application Processor (AP) 2010, a communication module 2020, a Subscriber Identification Module (SIM) card 2024, a memory 2030, a sensor module 2040, an input device 2050, a display 2060, an interface 2070, an audio module 2080, a camera module 2091, a power management module 2095, a battery 2096, an indicator 2097, and a motor 2098.

The AP 2010 controls a plurality of hardware or software components connected thereto by driving an operating system or an application program and performs a variety of data processing and calculations. The AP 2010 may be embodied as a System on Chip (SoC). The AP 2010 may further include a Graphical Processing Unit (GPU) and/or an image signal processor. The AP 2010 may also include at least some (for example, a cellular module 2021) of the components illustrated in FIG. 2. The AP 2010 loads instructions or data, received from at least one other component (for example, a non-volatile memory), in a volatile memory to process the loaded instructions or data, and stores various types of data in a non-volatile memory.

The communication module 2020 may have a configuration equal or similar to the communication interface 170 of FIG. 1. The communication module 2020 includes, for example, a cellular module 2021, a Wi-Fi module 2023, a BT module 2025, a GPS module 2027, an NFC module 2028, and a Radio Frequency (RF) module 2029.

The cellular module 2021 provides a voice call, video call, text message services, or Internet services through a communication network. The cellular module 2021 may distinguish between and authenticate electronic devices 2001 within a communication network using a SIM card 2024. The cellular module 2021 may perform at least some of the functions which may be provided by the AP 2010. The cellular module 2021 may include a Communication Processor (CP).

Each of the Wi-Fi module 2023, the BT module 2025, the GPS module 2027, and the NFC module 2028 may include a processor for processing data transmitted/received through the corresponding module. At least some (two or more) of the cellular module 2021, the Wi-Fi module 2023, the BT module 2025, the GPS module 2027, and the NFC module 2028 may be included in one Integrated Chip (IC) or IC package.

The RF module 2029 transmits/receives a communication signal (for example, an RF signal). The RF module 2029 may include a transceiver, a Power Amp Module (PAM), a frequency filter, a Low Noise Amplifier (LNA) or an antenna. Alternatively, at least one of the cellular module 2021, the Wi-Fi module 2023, the BT module 2025, the GPS module 2027, and the NFC module 2028 may transmit/receive an RF signal through a separate RF module.

The SIM card 2024 is a card including a subscriber identification module and/or an embedded SIM, and may further include unique identification information (for example, an Integrated Circuit Card Identifier (ICCID)) or subscriber information (for example, International Mobile Subscriber Identity (IMSI)).

The memory 2030 may include an internal memory 2032 or an external memory 2034. The internal memory 2032 includes at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disk drive, a Solid State Drive (SSD), and the like).

The external memory 2034 may include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 2034 may be functionally and/or physically connected to the electronic device 2001 through various interfaces.

The sensor module 2040 measures a physical quantity or detects an operation state of the electronic device 2001, and converts the measured or detected information to an electrical signal. The sensor module 2040 includes at least one of, for example, a gesture sensor 2040A, a gyro sensor 2040B, an atmospheric pressure sensor 2040C, a magnetic sensor 2040D, an accelerometer sensor 2040E, a grip sensor 2040F, a proximity sensor 2040G a color sensor 2040H (for example, a Red/Green/Blue (RGB) sensor), a biometric sensor 2040I, a temperature/humidity sensor 2040J, an illumination sensor 2040K, and an Ultra Violet (UV) sensor 2040M. Additionally or alternatively, the sensor module 2040 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2040 may further include a control circuit for controlling at least one sensor included therein. The electronic device 2001 may further include a processor configured to control the sensor module 2040 as a part of, or separately from, the AP 2010, and may control the sensor module 2040 while the AP 2010 is in a sleep state.

The input device 2050 includes, for example, a touch panel 2052, a (digital) pen sensor 2054, a key 2056, or an ultrasonic input device 2058.

The touch panel 2052 uses at least one of, for example, a capacitive type, a resistive type, an infrared type, and an ultrasonic type. The touch panel 2052 may further include a control circuit. The touch panel 2052 may further include a tactile layer, and provide a tactile reaction to a user.

The (digital) pen sensor 2054 may include a recognition sheet which is a part of the touch panel or a separate recognition sheet.

The key 2056 include, for example, a physical button, an optical key or a keypad. The ultrasonic input unit 2058 inputs data through an input means that generates an ultrasonic signal, and the electronic device 2001 identifies data by detecting a sound wave with a microphone 2088.

The display 2060 (for example, the display 160) may include a panel 2062, a hologram device 2064 or a projector 2066.

The panel 2062 may include a component which is the same as or similar to the display 160 of FIG. 1. The panel 2062 may be embodied to be flexible, transparent, or wearable. The panel 2062 may also be configured to be integrated with the touch panel 2052 as a single module.

The hologram device 2064 displays a stereoscopic image in the air by using interference of light.

The projector 2066 projects light onto a screen to display an image. The screen may be located inside or outside the electronic device 2001.

The display 2060 may further include a control circuit for controlling the panel 2062, the hologram device 2064, or the projector 2066.

The interface 2070 includes, for example, a High-Definition Multimedia Interface (HDMI) 2072, a Universal Serial Bus (USB) 2074, an optical interface 2076, or a D-subminiature (D-sub) 2078.

The interface 2070 may be included in the communication module 170 illustrated in FIG. 1.

Additionally or alternatively, the interface 2070 may include a Mobile High-definition Link (MHL) interface, a Secure Digital (SD) card/Multi-Media Card (MMC) interface, or an Infrared Data Association (IrDA) standard interface.

The audio module 2080 bilaterally converts a sound and an electrical signal. At least some components of the audio module 2080 may be included in the input/output interface 150 illustrated in FIG. 1. The audio module 2080 processes sound information input or output through a speaker 2082, a receiver 2084, earphones 2086, the microphone 2088, or the like.

For example, the camera module 2091 is a device which may photograph a still image and a dynamic image. According to an embodiment, the camera module 291 includes one or more image sensors (for example, a front sensor or a back sensor), a lens, an Image Signal Processor (ISP) or a flash (for example, LED or xenon lamp).

The power management module 2095 manages, for example, power of the electronic device 2001. According to an embodiment, the power management module 2095 includes a Power Management Integrated Circuit (PMIC), a charger Integrated Circuit (IC), or a battery gauge. The PMIC may have a wired and/or wireless charging scheme. Examples of the wireless charging method include, for example, a magnetic resonance scheme, a magnetic induction scheme, an electromagnetic wave scheme, and the like. Further, the power management module 2095 may further include additional circuits (for example, a coil loop, a resonance circuit, a rectifier, and the like.) for wireless charging. The battery gauge may measure, for example, the remaining amount of battery 2096, a charging voltage and current, or temperature. The battery 2096 includes, for example, a rechargeable battery and/or a solar battery.

The indicator 2097 indicates a particular status of the electronic device 2001 or a part thereof (for example, the AP 2010), for example, a booting status, a message status, a charging status, or the like.

The motor 2098 converts an electrical signal into mechanical vibrations, and generates a vibration or haptic effect.

The electronic device 2001 may include a processing device (for example, a GPU) for supporting mobile TV. The processing device for supporting mobile TV processes media data according to a standard of Digital Multimedia Broadcasting (DMB), Digital Video Broadcasting (DVB), media flow or the like.

Each of the components of the electronic device, according to various embodiments of the present disclosure, may be implemented by one or more components and the name of the corresponding component may vary depending on a type of the electronic device. The electronic device may include at least one of the above-described elements. Some of the above-described elements may be omitted from the electronic device, or the electronic device may further include additional elements. Further, some of the components of the electronic device may be combined to form a single entity, and thus, may equivalently execute functions of the corresponding elements prior to the combination.

The term "module" as used herein may refer to a unit including one of hardware, software, and firmware or a combination of two or more of them. The "module" may be interchangeable with a term, such as unit, logic, logical block, component, or circuit. The "module" may be the smallest unit of an integrated component or a part thereof. The "module" may be a minimum unit for performing one or more functions or a part thereof. The "module" may be mechanically or electronically implemented. For example, the "module" may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, at least some of the devices (for example, modules or functions thereof) or the method (for example, operations) of the present disclosure may be implemented by a command stored in a computer-readable storage medium in a programming module form. When the command is executed by one or more processors (for example, the processor 120), the one or more processors may execute a function corresponding to the command The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module, according to various embodiments of the present disclosure, may include one or more of the aforementioned components or may further include other additional components, or some of the aforementioned components may be omitted. Operations executed by a module, a programming module, or other component elements may be executed sequentially, in parallel, repeatedly, or in a heuristic manner. Further, some operations may be executed according to another order or may be omitted, or other operations may be added.

According to various embodiments of the present disclosure, a storage medium having commands stored therein is provided. The commands are configured to allow one or more processors to perform one or more operations when being executed by the one or more processors. The one or more operations include acquiring second device information on a second electronic device connected to a first electronic device; and determining a first application corresponding to a combination of the first electronic device and the second electronic device based on first device information on the first electronic device and the second device information.

The various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure. Accordingly, the scope of the present disclosure is not defined by the detailed description and various embodiments, but by the following claims and their equivalents.

What is claimed is:

1. A control method of a first electronic device, the control method comprising:
   receiving. from a second electronic device, second device information of the second electronic device connected to the first electronic device;
   identifying first attribute information of at least one second application provided by the first electronic device from first device information of the first electronic device:
   identifying second attribute information of at least one third application provided by the second electronic device from the second device information;
   identifying a first application corresponding to a combination of the first attribute information and the second attribute information; and
   outputting a user interface related to the first application.

2. The control method of claim 1, further comprising downloading the first application from a server.

3. The control method of claim 1, further comprising:
   storing correlation information on a correlation between an application and corresponding hardware based on an attribute of the application.

4. The control method of claim 3, wherein identifying the first application comprises identifying the first application by comparing the first attribute information and the second attribute information with the correlation information.

5. The control method of claim 1, further comprising:
acquiring third device information on a third electronic device connected to the second electronic device;
identifying third attribute information of at least one fourth application provided by the third electronic device from the third device information: and
identifying the first application based on the first attribute information, the second attribute information, and the third attribute information.

6. The control method of claim 1, further comprising:
identifying a first hardware type of the first electronic device from the first device information;
identifying a second hardware type of the second electronic device from the second device information;
identifying a user status based on the first hardware type and the second hardware type; and
identfying the first application in accordance with the user status.

7. The control method of claim 6, further comprising:
identifying hardware information similar to the first hardware type and the second hardware type:
identifying an analogous status from among a plurality of predetermined analogous statuses based on the hardware information; and
identifying the first application corresponding to the analogous status.

8. The control method of claim 1, further comprising:
acquiring a first distance between the first electronic device and the second electronic device; and
identifying the first application based on the first distance.

9. The control method of claim 8, further comprising:
acquiring a second distance between the first electronic device and a third electronic device; and
identifying the first application based on a result of the comparison between the first distance and the second distance.

10. The control method of claim 1, wherein the first application is different from the at least one second application and the at least one third application.

11. The control method of claim 1, wherein the first attribute information includes hardware information to be used by each of the at least one second application, and the second attribute information includes hardware information to be used by each of the at least one third application.

12. The control method of claim 1, wherein the connection between the first electronic device and the second electronic device includes a wired connection or a physical connection.

13. A first electronic device comprising:
a communication interface;
a display; and
a processor configured to:
receive, from a second electronic device, second device information on the second electronic device connected to the first electronic device;
identify first attribute information of at least one second application provided by the first electronic device from first device information of the first electronic device;
identify second attribute information of at least one third application provided by the second electronic device from the second device information;
identify a first application corresponding to a combination of the first attribute information and the second attribute information; and
output a user interface related to the first application via the display.

14. The first electronic device of claim 13, wherein the processor is further configured to download, via the communication interface, the first application from a server.

15. The first electronic device of claim 13, wherein the processor is further configured to:
control a memory to store correlation information on a correlation between an application and corresponding hardware based on an attribute of the application.

16. The first electronic device of claim 15, wherein the processor is further configured to identify the first application by comparing the first attribute information and the second attribute information with the correlation information.

17. The first electronic device of claim 13, wherein the processor is further configured to:
acquire third device information on a third electronic device connected to the second electronic device;
identify third attribute information of at least one fourth application provided by the third electronic device from the third device information; and
identify the first application based on the first attribute information, the second attribute information, and the third attribute information.

18. The first electronic device of claim 13, wherein the processor is further configured to:
identify a first hardware type of the first electronic device from the first device information;
identify a second hardware type of the second electronic device from the second device information;
identify a user status based on the first hardware type and the second hardware type; and
identify the first application in accordance with the user status.

19. The first electronic device of claim 18, wherein the processor is further configured to:
identify hardware information similar to the first hardware type and the second hardware type;
identify an analogous status from among a plurality of predetermined analogous statuses based on the hardware information; and
identify the first application corresponding to the analogous status.

20. The first electronic device of claim 13, wherein the processor is further configured to:
acquire a first distance between the first electronic device and the second electronic device; and
identify the first application based on the first distance.

21. The first electronic device of claim 20, wherein the processor is further configured to:
acquire a second distance between the first electronic device and a third electronic device; and
identify the first application based on a result of the comparison between the first distance and the second distance.

* * * * *